United States Patent
Rusanovskyy et al.

(10) Patent No.: US 11,228,770 B2
(45) Date of Patent: Jan. 18, 2022

(54) LOOP SAMPLE PROCESSING FOR HIGH DYNAMIC RANGE AND WIDE COLOR GAMUT VIDEO CODING

(71) Applicant: QUALCOMM Incorporated, San Diego, CA (US)

(72) Inventors: Dmytro Rusanovskyy, San Diego, CA (US); Done Bugdayci Sansli, La Jolla, CA (US); Joel Sole Rojals, San Diego, CA (US); Adarsh Krishnan Ramasubramonian, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 15/595,793

(22) Filed: May 15, 2017

(65) Prior Publication Data
US 2017/0332098 A1    Nov. 16, 2017

Related U.S. Application Data

(60) Provisional application No. 62/337,303, filed on May 16, 2016.

(51) Int. Cl.
| | |
|---|---|
| H04N 19/176 | (2014.01) |
| H04N 19/98 | (2014.01) |
| H04N 19/126 | (2014.01) |
| H04N 19/18 | (2014.01) |
| H04N 19/136 | (2014.01) |

(52) U.S. Cl.
CPC ......... *H04N 19/176* (2014.11); *H04N 19/126* (2014.11); *H04N 19/136* (2014.11); *H04N 19/18* (2014.11); *H04N 19/98* (2014.11)

(58) Field of Classification Search
None
See application file for complete search history.

(56) References Cited

U.S. PATENT DOCUMENTS

| | | | |
|---|---|---|---|
| 9,706,200 B2 | 7/2017 | Joshi et al. | |
| 2008/0175496 A1* | 7/2008 | Segall | G06T 5/009 382/238 |
| 2008/0253672 A1 | 10/2008 | Segall | |

(Continued)

FOREIGN PATENT DOCUMENTS

| | | |
|---|---|---|
| WO | WO-2012102867 | 8/2012 |
| WO | WO-2013192164 | 12/2013 |

OTHER PUBLICATIONS

Zhao, et al., "De-quantization and scaling for next generation containers," JVET document B0054, Jan. 2016.*

(Continued)

*Primary Examiner* — Michael J Hess
(74) *Attorney, Agent, or Firm* — Shumaker & Sieffert, P.A.

(57) ABSTRACT

A device for decoding video data receives the video data, determines a scaling parameter for a block of the video data; and scales the block in a video decoding loop using the scaling parameter to increase a dynamic range for luminance values of the block. A device for encoding video data partitions the video data into blocks; determines a scaling parameter for a block of the video data; and scales the block in a video encoding loop using the scaling parameter to decrease a dynamic range for luminance values of the block.

20 Claims, 17 Drawing Sheets

(56) References Cited

U.S. PATENT DOCUMENTS

| | | |
|---|---|---|
| 2009/0003457 A1 | 1/2009 | Liu et al. |
| 2012/0189052 A1 | 7/2012 | Karczewicz et al. |
| 2016/0309154 A1 | 10/2016 | Rusanovskyy |

OTHER PUBLICATIONS

Mrak, et al., "Intensity Dependent Spatial Quantization with Application in HEVC," Proc. IEEE Int. Conf. Multimedia Expo (ICME), Jul. 2013.*

Response to Written Opinion dated Sep. 18, 2017, from International Application No. PCT/US2017/032933, filed on Mar. 6, 2018, 20 pp.

Second Written Opinion from International Application No. PCT/US2017/032933, dated Jun. 11, 2018, 9 pp.

International Preliminary Report on Patentability from International Application No. PCT/US2017/032933, dated Sep. 10, 2018, 24 pp.

International Search Report and Written Opinion—PCT/US2017/032933—ISA/EPO—dated Sep. 18, 2017 19 pages.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.263, Series H: Audiovisual and Multimedia Systems, Infrastructure of audiovisual services—Coding of moving video, Video coding for low bit rate communication, The International Telecommunication Union, Jan. 2005, 226 pp.

ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.

ITU-T H.261, Line Transmission of Non-Telephone Signals, Video Codec for Audiovisual Services At px64 kbits, The International Telecommunication Union, Mar. 1993, 29 pp.

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

Invitation to Pay Additional Fees And, Where Applicable, Protest Fee from International Application No. PCT/US2017/032933, dated Jul. 25, 2017, 12 pp.

Matteo et al., "Intensity dependent spatial quantization with application in HEVC," 2013 IEEE International Conference on Multimedia and Expo (ICME), Jul. 15, 2013, XP032488115, ISSN: 1945-7871, DOI: 10.1109/ICME.2013.6607535, Retrieved on Sep. 24, 10 pp.

Sansli et al., "On Coefficient Scaling," The Joint Video Exploration Team of ISO/IEC JTC1/SC29/WG11 and ITU-T SG.16, 3. JVET Meeting; May 26-Jun. 1, 2016; Geneva; JVET-C0066, May 17, 2016, XP030150168, 5 pp.

Zhao et al., "De-quantization and scaling for next generation containers," The Joint Video Exploration Team of ISO/IEC JTC1/SC29/WG11 and ITU-T SG.16, 2. JVET Meeting; Feb. 20-26, 2016; San Diego, JVET-80054, Feb. 16, 2016 (Feb. 16, 2016), XP030150059, 5 pp.

Qualcomm Inc., "Dynamic Range Adjustment SEI to Enable High Dynamic Range Video Coding with Backward-Compatible Capability," International Telecommunication Union, Study Group 16, No. COM 16-C 1027-E, Sep. 2015, XP030100746, pp. 1-11.

Sharp Corporation., "Performance Investigation of High Dynamic Range and Wide Color Gamut Video Coding Techniques," International Telecommunication Union, Study Group 16, No. COM 16-C 1030-E, Sep. 2015, pp. 1-27.

Wang et al., "High efficiency video coding (HEVC) Defect Report," Joint Collaborative Team on Video Coding (JCT-VC) of ITU-T SG16 WP3 and ISO/IEC JTC1/SC29/WG11, 14th Meeting: Vienna, AT, Jul. 25-Aug. 2, 2013, JCTVC-N1003v1, 311 pp.

"Parameter values for the HDTV standards for production and international programme exchange," Recommendation ITU-R Rec. BT.709-6, International Telecommunication Union, ITU-R Radiocommunication Sector of ITU, BT Series, Broadcasting service (television), Jun. 2015, 19 pp.

"Parameter values for ultrahigh definition television systems for production and international programme exchange," Recommendation ITU-R Rec. BT.2020, International Telecommunication Union, ITU-R Radiocommunication Sector of ITU, BT Series, Broadcasting service (television), Oct. 2015, 8 pp.

"High Dynamic Range Electro-Optical Transfer Function of Mastering Reference Displays" SMPTE Standard, SMPTE-2084:2014; 14 pp.

European Search Report—EP20210112—Search Authority—Munich—dated Jan. 15, 2021.

* cited by examiner

Example of EOTFs

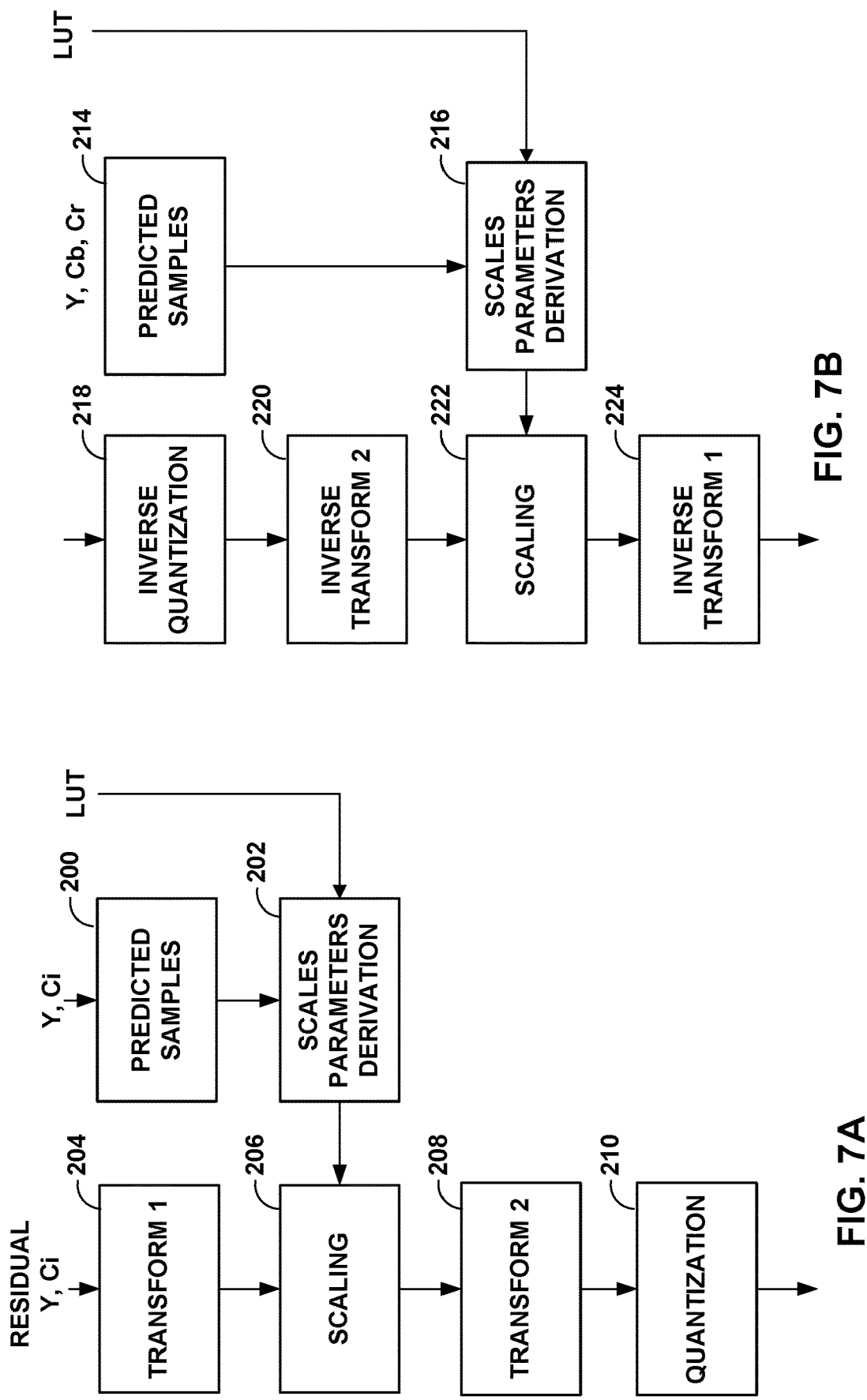

LOOP SAMPLE PROCESSING FOR HIGH DYNAMIC RANGE AND WIDE COLOR GAMUT VIDEO CODING

This application claims the benefit of U.S. Provisional Patent Application No. 62/337,303, filed 16 May 2016, the entire content of which is hereby incorporated by reference.

TECHNICAL FIELD

This disclosure relates to video processing.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

The total number of color values that may be captured, coded, and displayed may be defined by a color gamut. A color gamut refers to the range of colors that a device can capture (e.g., a camera) or reproduce (e.g., a display). Often, color gamuts differ from device to device. For video coding, a predefined color gamut for video data may be used such that each device in the video coding process may be configured to process pixel values in the same color gamut. Some color gamuts are defined with a larger range of colors than color gamuts that have been traditionally used for video coding. Such color gamuts with a larger range of colors may be referred to as a wide color gamut (WCG).

Another aspect of video data is dynamic range. Dynamic range is typically defined as the ratio between the minimum and maximum brightness (e.g., luminance) of a video signal. The dynamic range of common video data used in the past is considered to have a standard dynamic range (SDR). Other example specifications for video data define color data that has a larger ratio between the minimum and maximum brightness. Such video data may be described as having a high dynamic range (HDR).

SUMMARY

This disclosure relates to processing and coding of video data. The video processing apparatus and methods of this disclosure may include techniques applied in the coding loop of a video coding system. Such techniques may be applicable for coding video data representations with non-uniformly distributed perceived just noticeable difference (signal to noise ratio) of the data over its dynamic range.

According to one example, a method for decoding video data includes receiving the video data; determining a scaling parameter for a block of the video data; and scaling the block in a video decoding loop using the scaling parameter, wherein scaling the block increases a dynamic range for luminance values of the block.

According to another example, a device for decoding video data includes a memory configured to store the video data and one or more processors configured to receive the video data; determine a scaling parameter for a block of the video data; and scale the block in a video decoding loop using the scaling parameter, wherein scaling the block increases a dynamic range for luminance values of the block.

According to another example, an apparatus for decoding video data includes means for receiving the video data; means for determining a scaling parameter for a block of the video data; and means for scaling the block in a video decoding loop using the scaling parameter, wherein the means for scaling the block increases a dynamic range for luminance values of the block.

According to another example, a computer readable medium stores instructions that when executed by one or more processors cause the one or more processors to receive the video data; determine a scaling parameter for a block of the video data; and scale the block in a video decoding loop using the scaling parameter to increases a dynamic range for luminance values of the block.

According to another example, a method for encoding video data includes partitioning the video data into blocks; determining a scaling parameter for a block of the video data; and scaling the block in a video encoding loop using the scaling parameter, wherein scaling the block decreases a dynamic range for luminance values of the block.

According to another example, a device for encoding video data includes a memory configured to store the video data and one or more processors configured to partition the video data into blocks; determine a scaling parameter for a block of the video data; and scale the block in a video encoding loop using the scaling parameter, wherein scaling the block decreases a dynamic range for luminance values of the block.

According to another example, an apparatus for encoding video data includes means for partitioning the video data into blocks; means for determining a scaling parameter for a block of the video data; and means for scaling the block in a video encoding loop using the scaling parameter, wherein scaling the block decreases a dynamic range for luminance values of the block.

According to another example, a computer readable medium stores instructions that when executed by one or more processors cause the one or more processors to partition the video data into blocks; determine a scaling parameter for a block of the video data; and scale the block in a video encoding loop using the scaling parameter to decrease a dynamic range for luminance values of the block.

The details of one or more examples are set forth in the accompanying drawings and the description below. Other features, objects, and advantages will be apparent from the description, drawings, and claims.

BRIEF DESCRIPTION OF DRAWINGS

FIG. 7A is flow diagram showing an example video encoding process according to one example of the disclosure.

FIG. 7B is flow diagram showing an example video decoding process according to one example of the disclosure.

DETAILED DESCRIPTION

This disclosure relates to processing and coding of video data. The video processing apparatus and methods of this disclosure may include techniques for scaling video data in the coding loop of a video coding system. Such techniques may be applicable for coding video data representations with non-uniformly distributed perceived just noticeable difference (signal to noise ratio) of the data over its dynamic range.

According to techniques of this disclosure, a video encoder may scale a block of video data in a video encoding loop, using a scaling factor, to decrease a dynamic range for luminance values of the block, and when decoding the block of video, a video decoder may scale the block of video data in a video encoding loop, using the scaling factor, to increase the dynamic range for luminance values of the block. The scaling performed by the video decoder is reciprocal to the scaling performed by the video encoder. The scaling performed by the video decoder is sometimes referred to as inverse scaling. This disclosure will use the term scaling to mean both the scaling performed by a video encoder and the inverse scaling performed by a video decoder.

Figure 1:
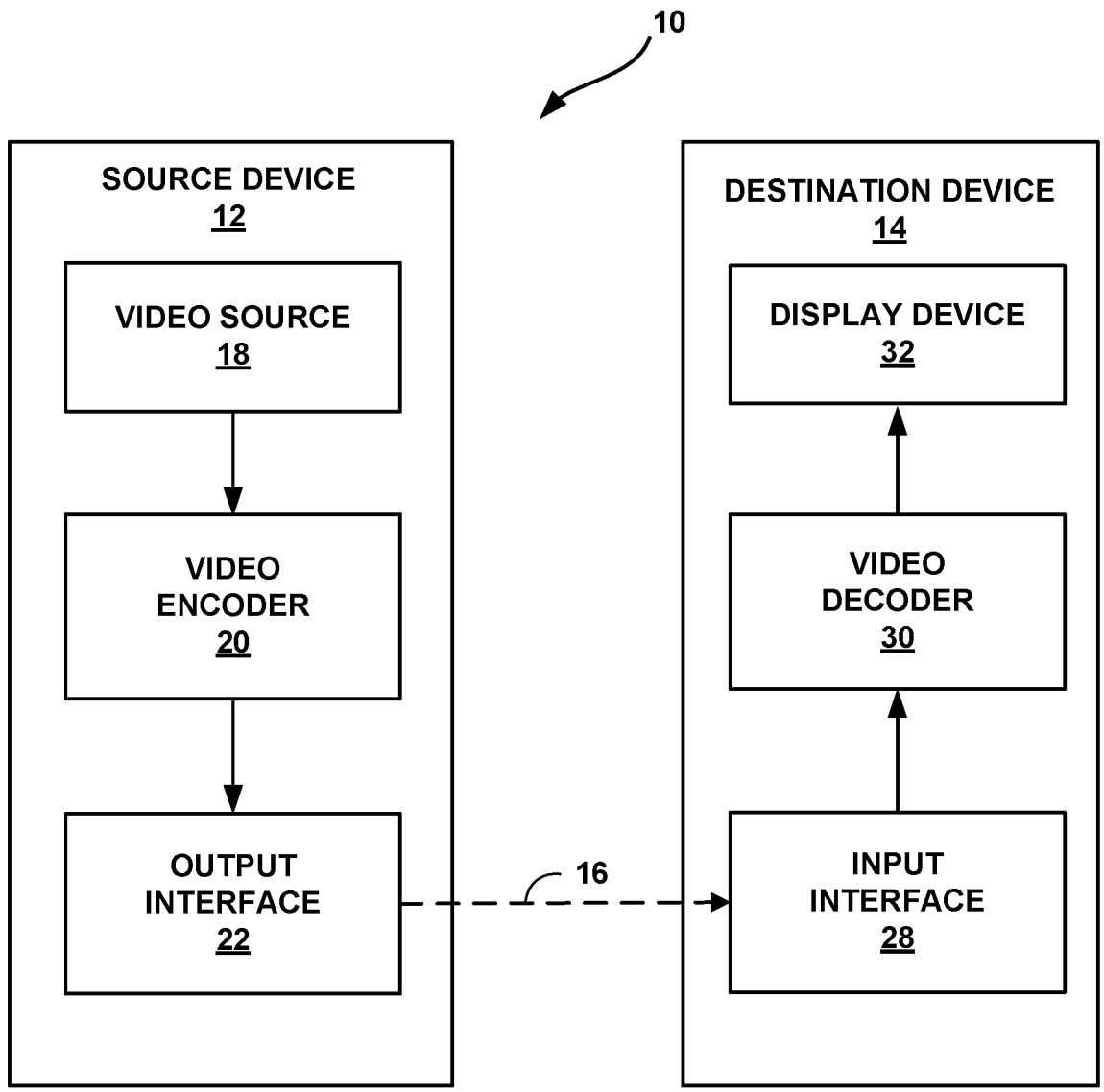
FIG. 1 is a block diagram illustrating an example video encoding and decoding system configured to implement the techniques of the disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wired or wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In other examples, computer-readable medium 16 may include non-transitory storage media, such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for in loop sample processing of HDR and WCG video data may be performed by any digital video encoding and/or video decoding device. Some example techniques of this disclosure may also be performed by a video preprocessor and/or video postprocessor. A video preprocessor may be any device configured to process video data before encoding (e.g., before HEVC encoding). A video postprocessor may be any device configured to process video data after decoding (e.g., after HEVC decoding). Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components, as well as a video preprocessor and a video postprocessor. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding and video processing, in general, and may be applied to wireless and/or wired applications. In each case, the captured, pre-captured, or computer-generated video may be encoded by video encoder 20. The encoded video information may then be output by output interface 22 onto a computer-readable medium 16.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based three-dimensional video (3DV) extension. In some instances, any bitstream conforming to MVC-based 3DV always contains a sub-bitstream that is compliant to a MVC profile, e.g., stereo high profile. Furthermore, there is an ongoing effort to generate a 3DV coding extension to H.264/AVC, namely AVC-based 3DV. Other examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual. In other examples, video encoder 20 and video decoder 30 may be configured to operate according to the HEVC standard.

The design of a new video coding standard, namely High Efficiency Video coding (HEVC, also called H.265), has been finalized by the Joint Collaboration Team on Video Coding (JCT-VC) of ITU-T Video Coding Experts Group (VCEG) and ISO/IEC Motion Picture Experts Group (MPEG). An HEVC draft specification referred to as HEVC Working Draft 10 (WD10), Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, JCTVC-L1003v34, is available from http://phenix.int-evry.fr/jct/doc_end_user/documents/12_Geneva/wg11/JCTVC-L1003-v34.zip. The finalized HEVC standard is referred to as HEVC version 1.

A defect report, Wang et al., "High efficiency video coding (HEVC) Defect Report," Joint Collaborative Team on Video Coding (JCT-VC) of ITU-T SG16 WP3 and ISO/IEC JTC1/SC29/WG11, 14th Meeting: Vienna, AT, 25 Jul.-2 Aug. 2013, JCTVC-N1003v1, is available from http://phenix.int-evry.fr/jct/doc_end_user/documents/14_Vienna/wg11/JCTVC-N1003-v1.zip. The finalized HEVC standard document is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2013, and another version of the finalized HEVC standard was published in October 2014. A copy of the H.265/HEVC specification text may be downloaded from http://www.itu.int/rec/T-REC-H.265-201504-I/en.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice.

Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion indicating a spatial displacement between a sample block of the PU and the first reference location and a second motion indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

Next generation video applications are anticipated to operate with video data representing captured scenery with HDR and a WCG. Parameters of the utilized dynamic range and color gamut are two independent attributes of video content, and their specification for purposes of digital television and multimedia services are defined by several international standards. For example ITU-R Rec. BT.709, "Parameter values for the HDTV standards for production and international programme exchange," defines parameters for HDTV (high definition television), such as standard dynamic range (SDR) and standard color gamut, and ITU-R Rec. BT.2020, "Parameter values for ultra-high definition television systems for production and international programme exchange," specifies UHDTV (ultra-high definition television) parameters such as HDR and WCG. There are also other standards developing organization (SDO) documents that specify dynamic range and color gamut attributes in other systems, e.g., DCI-P3 color gamut is defined in SMPTE-231-2 (Society of Motion Picture and Television Engineers) and some parameters of HDR are defined in SMPTE-2084. A brief description of dynamic range and color gamut for video data is provided below.

Dynamic range is typically defined as the ratio between the minimum and maximum brightness (e.g., luminance) of the video signal. Dynamic range may also be measured in terms of 'f-stop,' where one f-stop corresponds to a doubling of a signal's dynamic range. In MPEG's definition, HDR content is content that features brightness variation with more than 16 f-stops. In some terms, levels between 10 and 16 f-stops are considered as intermediate dynamic range, but may also be considered HDR according to other definitions. In some examples of this disclosure, HDR video content may be any video content that has a higher dynamic range than traditionally used video content with a standard dynamic range (e.g., video content as specified by ITU-R Rec. BT.709).

Figure 2:
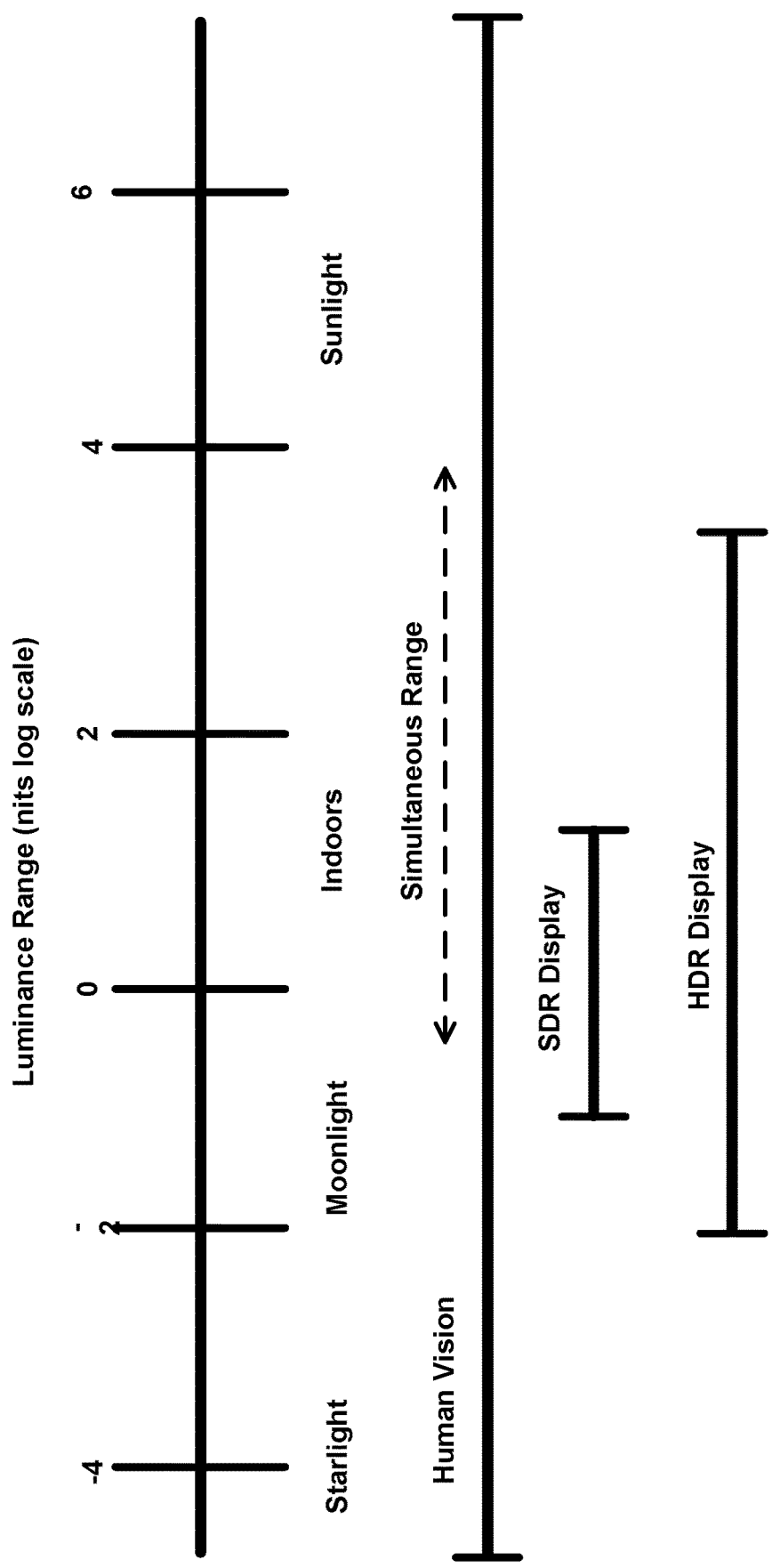
FIG. 2 is a conceptual drawing illustrating the concepts of HDR data.

The human visual system (HVS) is capable for perceiving much larger dynamic ranges than SDR content and HDR content. However, the HVS includes an adaptation mechanism to narrow the dynamic range of the HVS to a so-called simultaneous range. The width of the simultaneous range may be dependent on current lighting conditions (e.g., current brightness). Visualization of dynamic range provided by SDR of HDTV, expected HDR of UHDTV and HVS dynamic range is shown in FIG. 2.

Current video application and services are regulated by ITU Rec.709 and provide SDR, typically supporting a range of brightness (e.g., luminance) of around 0.1 to 100 candelas (cd) per m2 (often referred to as "nits"), leading to less than 10 f-stops. Some example next generation video services are expected to provide dynamic range of up to 16 f-stops. Although detailed specifications for such content are currently under development, some initial parameters have been specified in SMPTE-2084 and ITU-R Rec. 2020.

Figure 3:
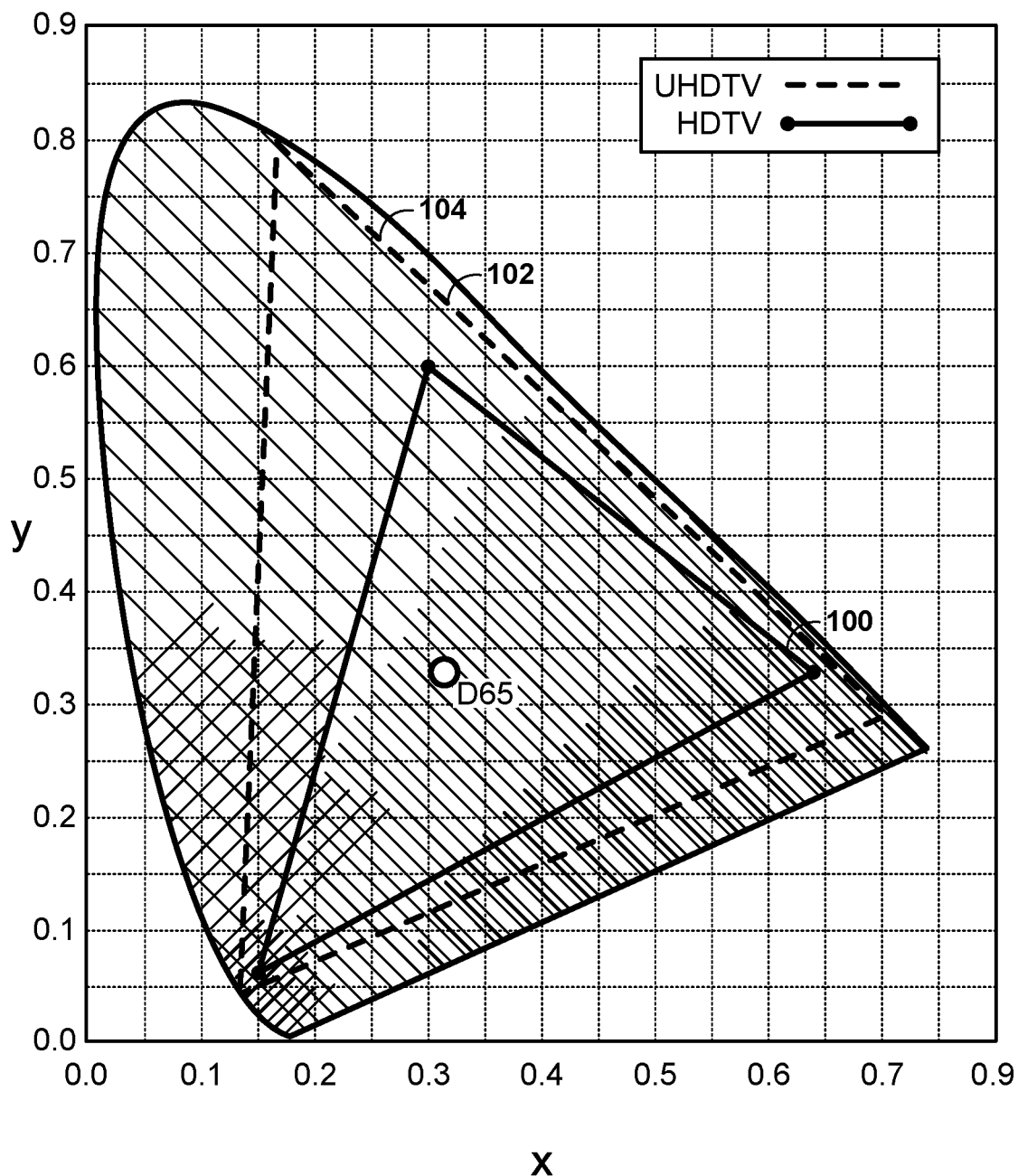
FIG. 3 is a conceptual diagram illustrating example color gamuts.

Another aspect for a more realistic video experience, besides HDR, is the color dimension. Color dimension is typically defined by the color gamut. FIG. 3 is a conceptual diagram showing an SDR color gamut (triangle 100 based on the BT.709 color primaries), and the wider color gamut that for UHDTV (triangle 102 based on the BT.2020 color primaries). FIG. 3 also depicts the so-called spectrum locus (delimited by the tongue-shaped area 104), representing the limits of the natural colors. As illustrated by FIG. 3, moving from BT.709 (triangle 100) to BT.2020 (triangle 102) color primaries aims to provide UHDTV services with about 70% more colors. D65 specifies an example white color for the BT.709 and/or BT.2020 specifications.

Examples of color gamut specifications for the DCI-P3, BT.709, and BT.202 color spaces are shown in Table 1.

TABLE 1

| Color gamut parameters | | | | | | | | |
|---|---|---|---|---|---|---|---|---|
| RGB color space parameters | | | | | | | | |
| | Color space | | | | | | | |
| | White point | | Primary colors | | | | | |
| | $x_W$ | $y_W$ | $x_R$ | $y_R$ | $x_G$ | $y_G$ | $x_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

As can be seen in Table 1, a color gamut may be defined by the X and Y values of a white point, and by the X and Y values of the primary colors (e.g., red (R), green (G), and blue (B). The X and Y values represent the chromaticity (X) and the brightness (Y) of the colors, as is defined by the CIE 1931 color space. The CIE 1931 color space defines the links between pure colors (e.g., in terms of wavelengths) and how the human eye perceives such colors.

HDR/WCG video data is typically acquired and stored at a very high precision per component (even floating point), with the 4:4:4 chroma sub-sampling format and a very wide color space (e.g., CIE XYZ). This representation targets high precision and is almost mathematically lossless. However, such a format for storing HDR/WCG video data may include a lot of redundancies and may not be optimal for compression purposes. A lower precision format with HVS-based assumptions is typically utilized for state-of-the-art video applications.

Figure 4:
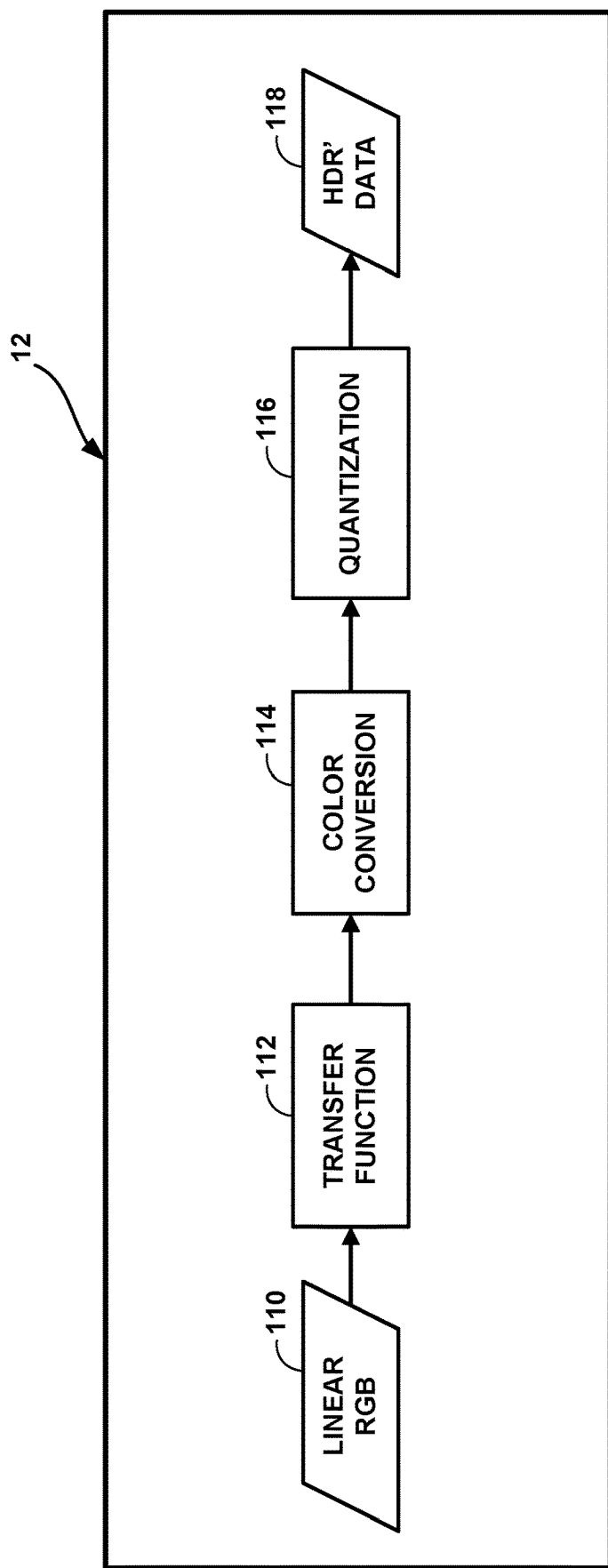
FIG. 4 is a flow diagram illustrating an example of HDR/WCG representation conversion.

One example of a video data format conversion process for purposes of compression includes three major processes, as shown in FIG. 4. The techniques of FIG. 4 may be performed by source device 12. Linear RGB data 110 may be HDR/WCG video data and may be stored in a floating point representation. Linear RGB data 110 may be compacted using a non-linear transfer function (TF) 112 for dynamic range compacting. Transfer function 112 may compact linear RGB data 110 using any number of nonlinear transfer functions, e.g., the PQ TF as defined in SN PTE-2084. In some examples, color conversion process 114 converts the compacted data into a more compact or robust color space (e.g., a YUV or YCrCb color space) that is more suitable for compression by a hybrid video encoder. This data is then quantized using a floating-to-integer representation quantization unit 116 to produce converted HDR' data 118. In this example HDR' data 118 is in an integer representation. The HDR' data is now in a format more suitable for compression by a hybrid video encoder (e.g., video encoder 20 applying HEVC techniques). The order of the processes depicted in FIG. 4 is given as an example, and may vary in other applications. For example, color conversion may precede the TF process. In addition, additional processing, e.g. spatial subsampling, may be applied to color components.

Figure 5:
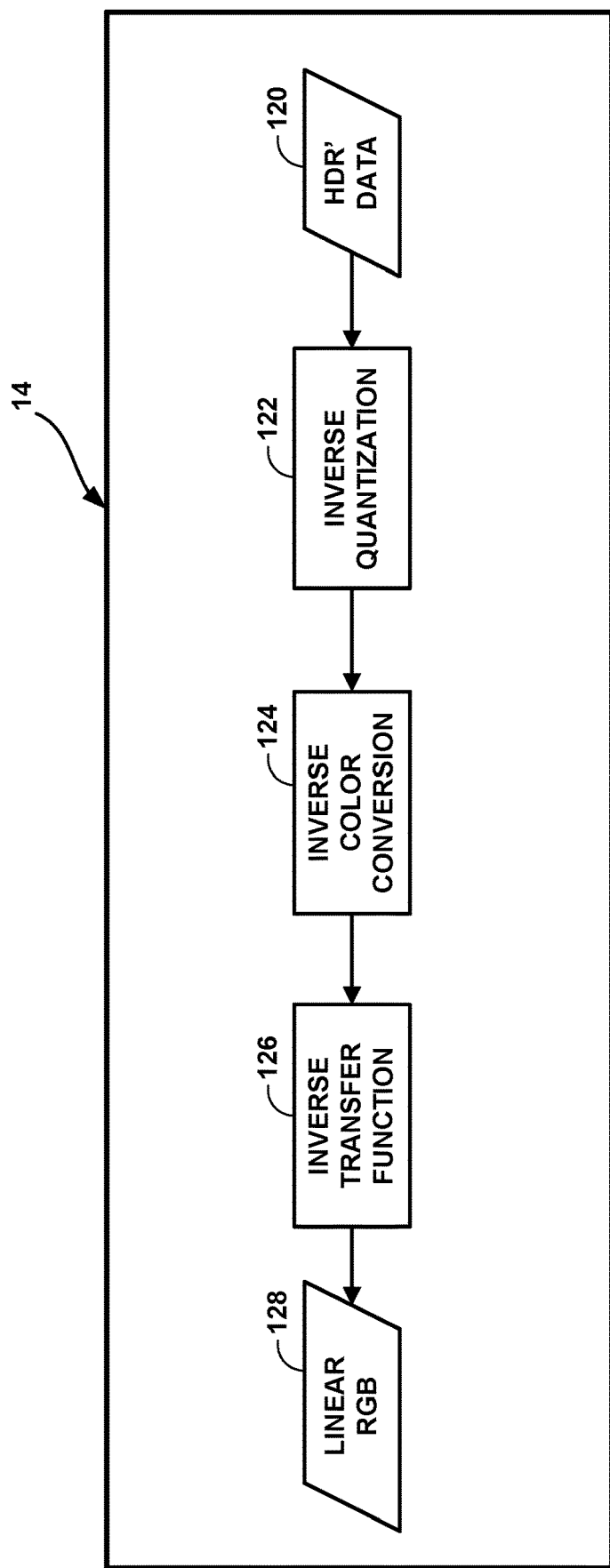
FIG. 5 is a flow diagram illustrating an example of HDR/WCG inverse conversion.

The inverse conversion at the decoder side is depicted in FIG. 5. The techniques of FIG. 5 may be performed by destination device 14. Converted HDR' data 120 may be obtained at destination device 14 through decoding video data using a hybrid video decoder (e.g., video decoder 30 applying HEVC techniques). HDR' data 120 may then be inverse quantized by inverse quantization unit 122. Then an inverse color conversion process 124 may be applied to the inverse quantized HDR' data. The inverse color conversion process 124 may be the inverse of color conversion process 114. For example, the inverse color conversion process 124 may convert the HDR' data from a YCrCb format back to an RGB format. Next, inverse transfer function 126 may be applied to the data to add back the dynamic range that was compacted by transfer function 112 to recreate the linear RGB data 128.

The techniques depicted in FIG. 4 will now be discussed in more detail. In general a transfer function is applied to data (e.g., HDR/WCG video data) to compact the dynamic range of the data. Mapping the digital values appearing in an image container to and from optical energy requires knowledge of the "transfer function." The TF is applied to the data to compact the data's dynamic range, thus enabling the data to be represented with a limited number of bits. This function is typically a one-dimensional (1D) non-linear function either reflecting inverse of electro-optical transfer function (EOTF) of the end-user display as specified for SDR in ITU-R BT. 1886 (also defined in Rec.709) or an approximating the HVS perception to brightness changes as for PQ TF specified in SMPTE-2084 for HDR. The inverse process of the OETF is the EOTF (electro-optical transfer function), which maps the code levels back to luminance.

Figure 6:
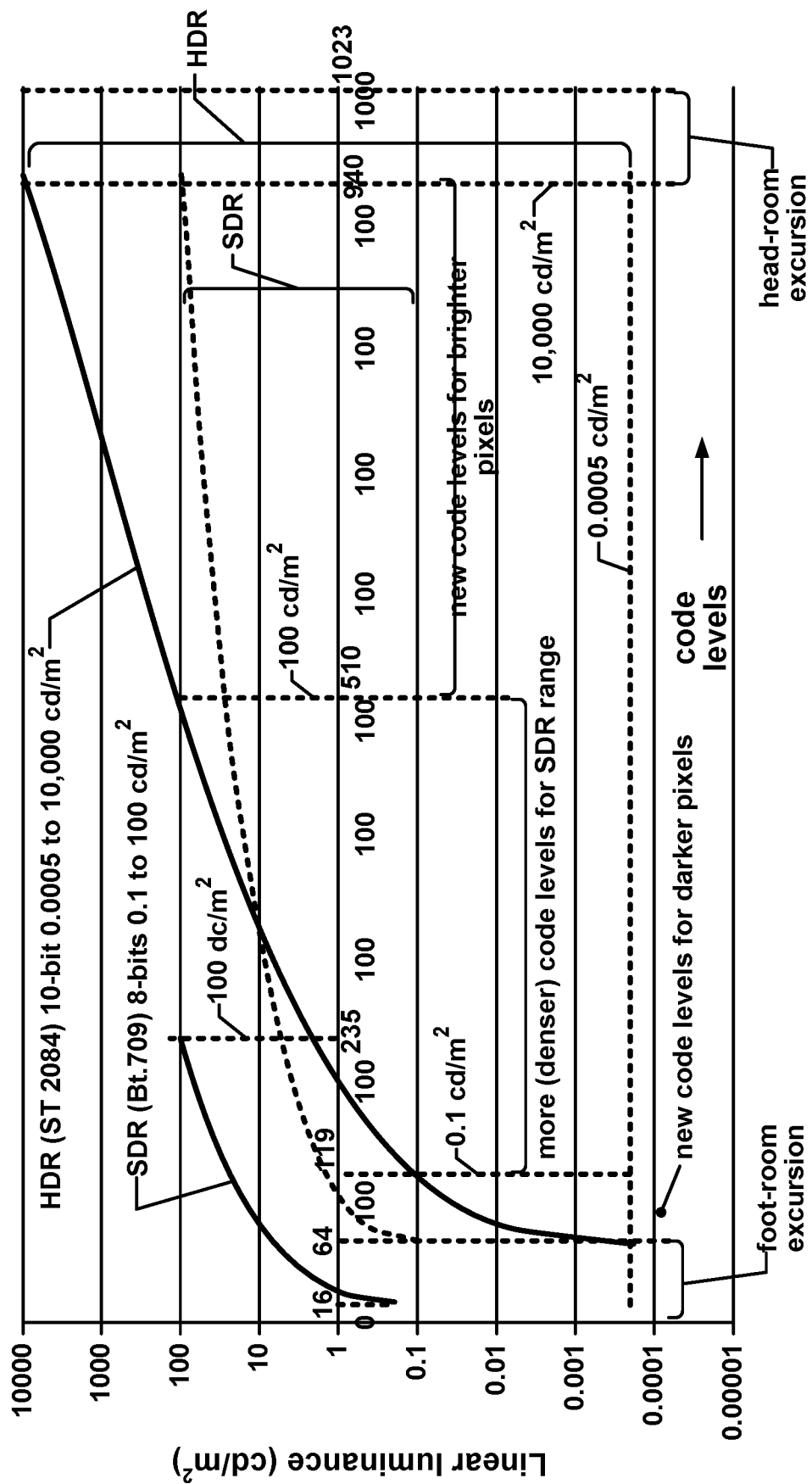
FIG. 6 is conceptual diagram illustrating example of Electro-optical transfer functions (EOTF) utilized for video data conversion (including SDR and HDR) from perceptually uniform code levels to linear luminance.

FIG. 6 shows several examples of non-linear transfer function used to compact the dynamic range of certain color containers. The transfer functions may also be applied to each R, G and B component separately. The reference EOTF specified ITU-R recommendation BT.1886 is specified by the equation:

$$L = a(\max[(V+b), 0])^\gamma$$

where:
L: Screen luminance in cd/m2
$L_W$: Screen luminance for white
$L_B$: Screen luminance for black
V: Input video signal level (normalized, black at V=0, to white at V=1. For content mastered per Recommendation ITU-R BT.709, 10-bit digital code values "D" map into values of V per the following equation: V=(D−64)/876
γ: Exponent of power function, γ=2.40$_4$
a: Variable for user gain (legacy "contrast" control)

$$a = (L_W^{1/\gamma} - L_B^{1/\gamma})^\gamma$$

b: Variable for user black level lift (legacy "brightness" control)

$$b = \frac{L_B^{1/\gamma}}{L_W^{1/\gamma} - L_B^{1/\gamma}}$$

Above variables a and b are derived by solving following equations in order that V=1 gives L=$L_W$ and that V=0 gives L=$L_B$:

$$L_B = a \cdot b^\gamma$$

$$L_W = a \cdot (1+b)^\gamma$$

In order to support higher dynamic range data more efficiently, SMPTE has recently standardized a new transfer function called SMPTE ST-2084. Specification of ST2084 defined the EOTF application as following. TF is applied to a normalized linear R, G, B values, which results in non-linear representation of R'G'B'. ST2084 defines normalization by NORM=10000, which is associated with a peak brightness of 10000 nits (cd/m2).

$$
\begin{aligned}
a.\ & R' = \text{PQ\_TF}(\max(0, \min(R/\text{NORM}, 1))) \\
b.\ & G' = \text{PQ\_TF}(\max(0, \min(G/\text{NORM}, 1))) \\
c.\ & B' = \text{PQ\_TF}(\max(0, \min(B/\text{NORM}, 1)))
\end{aligned}
\tag{1}
$$

$$\text{with } \text{PQ\_TF}(L) = \left(\frac{c_1 + c_2 L^{m_1}}{1 + c_3 L^{m_1}}\right)^{m_2}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Typically, EOTF is defined as a function with a floating point accuracy, thus no error is introduced to a signal with this non-linearity if inverse TF so called OETF is applied. Inverse TF (OETF) specified in ST2084 is defined as inversePQ function:

$$
\begin{aligned}
d.\ & R = 10000 * \text{inverse PQ\_TF}(R') \\
e.\ & G = 10000 * \text{inverse PQ\_TF}(G') \\
f.\ & B = 10000 * \text{inverse PQ\_TF}(B')
\end{aligned}
\tag{2}
$$

$$\text{with inverse PQ\_TF}(N) = \left(\frac{\max[(N^{1/m_2} - c_1), 0]}{c_2 - c_3 N^{1/m_2}}\right)^{1/m_1}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Note, that EOTF and OETF is a subject of very active research and standardization, and TF utilized in some video coding systems may be different from ST2084.

In the context of this disclosure, the terms "signal value" or "color value" may be used to describe a luminance level corresponding to the value of a specific color component (such as R, G, B, or Y) for an image element. The signal value is typically representative of a linear light level (luminance value). The terms "code level" or "digital code value" may refer to a digital representation of an image signal value. Typically, such a digital representation is representative of a nonlinear signal value. An EOTF represents the relationship between the nonlinear signal values provided to a display device (e.g., display device 32) and the linear color values produced by the display device.

RGB data is typically utilized as the input color space, since RGB is the type of data that is typically produced by image capturing sensors. However, the RGB color space has high redundancy among its components and is not optimal for compact representation. To achieve more compact and a more robust representation, RGB components are typically converted (e.g., a color transform is performed) to a more uncorrelated color space that is more suitable for compression, e.g., YCbCr. A YCbCr color space separates the brightness in the form of luminance (Y) and color information (CrCb) in different less correlated components. In this context, a robust representation may refer to a color space featuring higher levels of error resilience when compressed at a constrained bitrate.

For modern video coding systems, a typically used color space is YCbCr, as specified in ITU-R BT.709. The YCbCr color space in BT.709 standard specifies the following conversion process from R'G'B' to Y'CbCr (non-constant luminance representation):

$$Y' = 0.2126*R' + 0.7152*G' + 0.0722*B' \quad (3)$$
$$Cb = \frac{B' - Y'}{1.8556}$$
$$Cr = \frac{R' - Y'}{1.5748}$$

The above can also be implemented using the following approximate conversion that avoids the division for the Cb and Cr components:

$$Y'=0.212600*R'+0.715200*G'+0.072200*B'$$

$$Cb=-0.114572*R'-0.385428*G'+0.500000*B'$$

$$Cr=0.500000*R'-0.454153*G'-0.045847*B' \quad (4)$$

The ITU-R BT.2020 standard specifies the following conversion process from R'G'B' to Y'CbCr (non-constant luminance representation):

$$Y' = 0.2627*R' + 0.6780*G' + 0.0593*B' \quad (5)$$
$$Cb = \frac{B' - Y'}{1.8814}$$
$$Cr = \frac{R' - Y'}{1.4746}$$

The above can also be implemented using the following approximate conversion that avoids the division for the Cb and Cr components:

$$Y'=0.262700*R'+0.678000*G'+0.059300*B'$$

$$Cb=-0.139630*R'-0.360370*G'+0.500000*B'$$

$$Cr=0.500000*R'-0.459786*G'-0.040214*B' \quad (6)$$

Following the color transform, input data in a target color space may be still represented at high bit-depth (e.g. floating point accuracy). The high bit-depth data may be converted to a target bit-depth, for example, using a quantization process. Certain studies show that 10-12 bits accuracy in combination with the PQ transfer is sufficient to provide HDR data of 16 f-stops with distortion below the Just-Noticeable Difference (JND). In general, a JND is the amount something (e.g., video data) must be change in order for a difference to be noticeable (e.g., by the HVS). Data represented with 10 bits accuracy can be further coded with most of the state-of-the-art video coding solutions. This quantization is an element of lossy coding and is a source of inaccuracy introduced to converted data.

An example of such quantization applied to code words in target color space (in this example YCbCr color space) is shown below. Input values YCbCr represented in floating point accuracy are converted into a signal of fixed bit-depth BitDepthY for the Y value and BitDepthC for the chroma values (Cb, Cr).

g. $D_Y=Clip1_Y(Round((1<<(BitDepth_Y-8))*(219*Y'+16)))$ h. $D_{Cb}=Clip1_C(Round((1<<(BitDepth_C-8))*(224*Cb+128)))$ i. $D_{Cr}=Clip1_C(Round((1<<(BitDepth_C-8))*(224*Cr+128)))$ (7)

with
Round(x)=Sign(x)*Floor(Abs(x)+0.5)
Sign(x)=-1 if x<0, 0 if x=0, 1 if x>0
Floor(x) the largest integer less than or equal to x
Abs(x)=x if x>=0, -x if x<0
$Clip1_Y(x)=Clip3(0, (1<<BitDepth_Y)-1, x)$
$Clip1_C(x)=Clip3(0, (1<<BitDepth_C)-1, x)$
Clip3(x,y,z)=x if z<x, y if z>y, z otherwise It is anticipated that next generation HDR/WCG video applications will operate with video data captured at different parameters of HDR and CG. Examples of different configuration can be the capture of HDR video content with peak brightness up-to 1000 nits, or up-to 10,000 nits. Examples of different color gamut may include BT.709, BT.2020 as well SMPTE specified-P3, or others.

It is also anticipated that a single color space, e.g., a target color container, that incorporates all other currently used color gamut to be utilized in future. One example of such a target color container is BT.2020. Support of a single target color container would significantly simplify standardization, implementation and deployment of HDR/WCG systems, since a reduced number of operational points (e.g., number of color containers, color spaces, color conversion algorithms, etc.) and/or a reduced number of required algorithms should be supported by a decoder (e.g., video decoder 30).

In one example of such a system, content captured with a native color gamut (e.g. P3 or BT.709) different from the target color container (e.g. BT.2020) may be converted to the target container prior to processing (e.g., prior to video encoding). Below are several examples of such conversion:

RGB conversion from BT.709 to BT.2020 color container:

j. $R_{2020}=0.627404078626*R_{709}+0.329282097415*G_{709}+0.043313797587*B_{709}$ k. $G_{2020}=0.069097233123*R_{709}+0.919541035593*G_{709}+0.011361189924*B_{709}$ l. $B_{2020}=0.016391587664*R_{709}+0.088013255546*G_{709}+0.895595009604*B_{709}$ (1)

RGB conversion from P3 to BT.2020 color container:

m. $R_{2020}=0.753832826496*R_{P3}+0.198597635641*G_{P3}+0.047569409186*B_{P3}$ n. $G_{2020}=0.045744636411*R_{P3}+0.941777687331*G_{P3}+0.012478735611*B_{P3}$ o. $B_{2020}=-0.001210377285*R_{P3}+0.017601107390*G_{P3}+0.983608137835*B_{P3}$ (2)

During this conversion, the dynamic range of a signal captured in P3 or BT.709 color gamut may be reduced in a BT.2020 representation. Since the data is represented in floating point accuracy, there is no loss; however, when combined with color conversion (e.g., a conversion from RGB to YCrCB shown in equation 3 below) and quantization (example in equation 4 below), dynamic range reduction leads to increased quantization error for input data.

p. $Y' = 0.2627*R' + 0.6780*G' + 0.0593*B';$ (3)
$Cb = \dfrac{B'-Y'}{1.8814}; Cr = \dfrac{R'-Y'}{1.4746}$ q. $D_{Y'} = (\text{Round}((1 \ll (BitDepth_Y - 8))*(219*Y' + 16)))$ (4)
r. $D_{Cb} = (\text{Round}((1 \ll (BitDepth_{Cr} - 8))*(224*Cb + 128)))$
s. $D_{Cr} = (\text{Round}((1 \ll (BitDepth_{Cb} - 8))*(224*Cr + 128)))$ In equation (4) $D_{Y'}$ is the quantized Y' component, $D_{Cb}$ is the quantized Cb and $D_{Cr}$ is the quantized Cr component. The term $\ll$ represents a bit-wise right shift. $BitDepth_Y$, $BitDepth_{Cr}$, and $BitDepth_{Cb}$ are the desired bit depths of the quantized components, respectively.

Some of the transfer functions and color transforms may result in video data representation that features significant variation of Just-Noticeable Difference (JND) threshold values over the dynamic range of the signal representation. For such representations, a quantization scheme uniform over the dynamic range of luma values would introduce quantization errors with different merits of perception over the signal fragments (partitions of dynamical range). Such impact on signals may be interpreted as a processing system with a non-uniform quantization which results in unequal signal-to-noise ratios within a processed data range.

An example of such representation is a video signal represented in Non Constant Luminance (NCL) YCbCr color space whose color primaries defined in ITU-R Rec. BT.2020 and with ST 2084 transfer function. As illustrated in Table 2 below, this representation allocates significantly larger amounts of codewords for the low intensity values of the signal, e.g., 30% of codewords represent linear light samples <10 nits, whereas high intensity samples (high brightness) are represented with a much smaller amount of codewords, e.g., 25% of codewords are allocated for linear light in the range 1000-10000 nits. As a result, video coding system, e.g. H.265/HEVC, featuring uniform quantization for all range of the data would introduce much more severe coding artifacts to the high intensity samples (bright region of the signal), where distortion introduced to low intensity samples (dark region of the same signal) would be far below noticeable difference.

Effectively, this means that video coding system design, or encoding algorithms, may need to be adjusted for every selected video data representation, namely for every selected transfer function and color space.

TABLE 2

Relation between linear light intensity and code value in SMPTE ST 2084 (bit depth = 10)

| Linear light intensity (cd/m²) | Full range | SDI range | Narrow range |
|---|---|---|---|
| ~0.01 | 21 | 25 | 83 |
| ~0.1 | 64 | 67 | 119 |
| ~1 | 153 | 156 | 195 |
| ~10 | 307 | 308 | 327 |
| ~100 | 520 | 520 | 509 |
| ~1,000 | 769 | 767 | 723 |
| ~4,000 | 923 | 920 | 855 |
| ~10,000 | 1023 | 1019 | 940 |

The following techniques have been proposed to address the problem of non-optimal perceptual quality codeword distribution.

One example technique is described in "Dynamic Range Adjustment SEI to enable High Dynamic Range video coding with Backward-Compatible Capability," D. Rusanovskyy, A. K. Ramasubramonian, D. Bugdayci, S. Lee, J. Sole, M. Karczewicz, VCEG document COM16-C 1027-E, September 2015. Examples of this techniques are described in U.S. patent application Ser. No. 15/099,256, filed Apr. 14, 2016, U.S. Provisional Application No. 62/221,586, filed Sep. 21, 2015 and U.S. Provisional Application 62/236,804, filed Oct. 2, 2015, the entire content of each of which is incorporated by reference herein.

In this paper, the authors proposed to apply a codewords re-distribution to a video data prior to video coding. Video data in the ST 2084/BT.2020 representation undergoes a codeword re-distribution prior to the video compression. Introduced re-distribution introduces linearization of perceived distortion (signal to noise ratio) within a dynamical range of the data through a Dynamical Range Adjustment. This redistribution was found to improve visual quality under the bitrate constrains. To compensate the redistribution and convert data to the original ST 2084/BT.2020 representation, an inverse process is applied to the data after video decoding.

One of the drawbacks of this approach is the fact that the pre- and post-processing is generally de-coupled from rate distortion optimization processing employed by state-of-the-art encoders at the block based basis. Therefore, it cannot employ information available to the decoder, such as target frame rate of quantization distortion introduced by quantization scheme of video codec.

Another example technique is described in "Performance investigation of high dynamic range and wide color gamut video coding techniques", J. Zhao, S.-H. Kim, A. Segall, K. Misra, VCEG document COM16-C 1030-E, September 2015

In this paper, an intensity dependent spatially varying (block based) quantization scheme was proposed to align bitrate allocation and visually perceived distortion between video coding applied on $Y_{2020}$ (ST2084/BT2020) and $Y_{709}$ (BT1886/BT 2020) representations. It was observed that to maintain the same level of quantization in luma, the quantization of signal in Y2020 and Y709 must differ by a value that depends on luma, such that:

$QP\_Y_{2020}=QP\_Y_{709}-f(Y_{2020})$

The function $f(Y_{2020})$ was found to be linear for intensity values (brightness level) of video in $Y_{2020}$, and may be approximated as:

$f(Y_{2020})=\max(0.03*Y_{2020}-3,0)$

Proposed spatially varying quantization scheme being introduced at the encoding stage was found to be able to improve visually perceived signal-to-quantization noise ratio for coded video signal in ST 2084/BT.2020 representation.

One of the drawbacks of this approach is a block based granularity of QP adaptation. Typically utilized block sizes selected at the encoder side for compression are derived through a rate distortion optimization process, and may not represent dynamical range properties of the video signal, thus selected QP settings will be sub-optimal for the signal inside of the block. This problem may become even more important for the next generation video coding systems that tend to employ prediction and transform block sizes of larger dimensions. Another aspect of this design is a need for signaling of QP adaptation parameters which are signaled to the decoder side for inverse dequantization. Additionally, spatial adaptation of quantization parameters at the encoder side increase the complexity of encoding optimization and may interfere with rate control algorithms.

Another example technique is described in "Intensity dependent spatial quantization with application in HEVC," Matteo Naccari and Marta Mrak, In Proc. of IEEE ICME 2013, July 2013.

In this paper, an Intensity Dependent Spatial Quantization (IDSQ) perceptual mechanism is proposed which exploits the intensity masking of the human visual system and perceptually adjusts quantization of the signal at the block level. The authors propose to employ in-loop pixel domain scaling. Parameters of in-loop scaling for currently processed block are derived from average values of luma component in the predicted block. At the decoder side, the inverse scaling is performed, and decoder derives parameters of scaling from predicted block available at the decoder side.

Similarly to a work in the Zhao paper described above, a block based granularity of this approach restricts the performance of this method due sub-optimality of scaling parameter which is applied to all samples of the processed block. Another aspect of the proposed solution is that the scale value is derived from predicted block and does not reflect signal fluctuation which may happen between current codec block and predicted.

Another example technique is described in "De-quantization and scaling for next generation containers," J. Zhao, A. Segall, S.-H. Kim, K. Misra (Sharp), JVET document B0054, January 2016

To address a problem of non-uniform perceived distortion in the ST 2084/BT2020 representation, the authors of the paper above proposed to employ in-loop intensity dependent block based transform domain scaling. Parameters of in-loop scaling for selected transform coefficients (AC coefficients) of the currently processed block are derived as a function of average values of luma component in the predicted block and DC value derived for the current block. At the decoder side, the inverse scaling is performed, and decoder derives parameters of AC coefficient scaling from predicted block available at the decoder side and from quantized DC value which is signaled to the decoder.

Similarly to works described above, a block based granularity of this approach restricts the performance of this method due sub-optimality of scaling parameter which is applied to all samples of the processed block. Another aspect of the proposed solution is that the scale value is applied to AC transform coefficients only; therefor signal-to-noise ratio improvement does not affect the DC value, which reduces the performance of the scheme. In addition to this, in some video coding system design, quantized DC value may not be available at the time AC values scaling, e.g., in the case when quantization process is following a cascade of transform operations. Another restriction of this proposal is that when the encoder selects the transform skip or transform/quantization bypass modes for the current block, scaling is not applied; hence, in the decoder scaling is not defined for transform skip and transform/quantization bypass modes, which is sub-optimal due to exclusion of potential coding gain for these two modes.

This disclosure describes several processing techniques applied in the coding loop of the video coding system. These techniques include the process of scaling of the video signal in the pixel domain or in a transform domain to improve signal-to-quantization noise ratios for processed data. The described techniques also include several techniques for the derivation of scaling parameters from spatio temporal neighborhood of the signal as well as from syntax elements of compressed bitstream.

One or more of the following techniques may be applied independently, or in combination with others.

(1) Scaling of the video signal by applying a determined multiplier and an offset value by any of these techniques independently or in combination with others:
  a. multiplication of signal sample value in pixel domain
  b. multiplication of signal sample value in residual domain
  c. multiplication of signal sample value in a transform domain
  d. scaling of the transform basis function prior to conducting the transformation of the signal
  e. scaling of transform basis function by updating the normalization factors for each transfer function
  f. updating the quantization scheme value with derived scale
  g. multiplication of the elements of a default or custom quantization weighting matrix with the derived scale and enable the use of the quantizer weighting matrix in quantization/dequantization
  h. updating the elements of a default or custom quantization weighting matrix (that is signaled) with the derived scale/offset values (2) Derivation of scaling parameters (multiplier and offset) for each component of video signal by any of these techniques independently or in a combination with others:
  a. as a function of intensity of predicted samples associated with samples being currently coded, e.g., average of predicted samples for a coded component, both average and standard derivation of predicted samples for a coded component, etc.
  b. as a function of intensity of predicted luma component associated with samples being currently coded, e.g., average of predicted luma samples, both average and standard derivation of predicted luma samples, etc.
  c. as a function of sample values in the prediction block, e.g. mapping through a lookup table
  d. as a function of sample value located in spatio-temporal neighborhood of currently coded set of samples, e.g. weighted average of neighboring samples
  e. as a function of syntax element value decoded from the bitstream, e.g. adjustment values for scaling parameters derived at the decoder side through a specified process (3) Signaling of parameters of derivation and/or scaling process as syntax elements of bitstream:
  a. a type of scaling process, e.g., in pixel or in transform domain
  b. a type of derivation process or combination of processes
  c. parameters of derivation process, e.g., size of spatio-temporal neighborhood utilized in derivation process
  d. adjustment to scaling parameters being derived by other derivation process The follow section includes several examples of techniques disclosed in the previous section. FIGS. 7A, 8A, 9A, 10A, and 11A are flowcharts showing example video encoding process according to examples of the disclosure. Aspects of FIGS. 7A, 8A, 9A, 10A, and 11A will be described with reference to video encoder 20, although the techniques of FIGS. 7A, 8A, 9A, 10A, and 11A may also be performed by other types of video encoders. FIGS. 7B, 8B, 9B, 10B, and 11B are flowcharts showing example video decoding processes according to examples of the disclosure. Aspects of FIGS. 7B, 8B, 9B, 10B, and 11B will be described with reference to video decoder 30, although the techniques of FIGS. 7B, 8B, 9B, 10B, and 11B may also be performed by other types of video decoders.

FIGS. 7A and 7B show examples of video encoding and decoding processes, respectively, where scaling is applied to transform coefficients of the first transform (Transform1) in the transform chain, and scaling parameters derivation is conducted from predicted samples of the same color component.

Scaling process at the encoder side is implemented as following:

$$X = x * \text{scale} + \text{offset}$$

Where x—term stands for transform coefficients resulting from Transform 1. Derivation process for scale value is implemented as following:

$$\text{scale} = LUT[\text{average}(pCi)],$$

where pCi are predicted samples of currently coded block, and LUT is a lookup table predefined for currently coded color component. The LUT can be made available to encoder and decoder as side information or can be provided to the decoder as parametric function through coded bitstream.

At the decoder side (e.g., FIG. 7B), an inverse process is applied. Scaling is applied to transform coefficients prior to application of the inverse Transform 1. The process of inverse scaling at the decoder side can be implemented as:

$$y = Y/\text{scale} - \text{offset}$$

where Y are decoded (dequantized and possibly processed by the inverse Transform2) scaled Transform1 coefficients and y are transform coefficients after inverse scaling is applied. The derivation process for scale value is identical to a process utilized at the encoder side and can be implemented as following:

$$\text{scale} = LUT[\text{average}(pCi)],$$

where pCi are predicted samples of currently coded block, LUT is a lookup table predefined for currently coded color component. In some examples, the process of inverse scaling through division can be implemented with multiplication and right shifts.

In the example of FIG. 7A, video encoder 20 determines predicted samples for a block of video data (200). Video encoder 20 may, for example, determine the predicted samples using intra prediction, inter prediction, or some other prediction technique. Based on the predicted samples and based on a LUT, video encoder 20 derives scaling parameters (202). Video encoder 20 determines residual data for the block of video data and transforms the residual data using a first transform to determine transform coefficients (204). Video encoder 20 scales the transform coefficients, using the determined scaling parameters, to determine scaled transform coefficients (206). Video encoder 20 transforms the scaled transform coefficients using a second transform to determine twice-transformed, scaled coefficients (208). Video encoder 20 quantizes the twice-transformed, scaled coefficients (210). The techniques of FIG. 7A may be performed separately for luma and chroma components of the video data.

In the example of FIG. 7B, video decoder 30 determines predicted samples for a block of video data (214). Video decoder 30 may, for example, determine the predicted samples using intra prediction, inter prediction, or some other prediction technique. Based on the predicted samples and based on a LUT, video decoder 30 derives scaling parameters (216). Video decoder 30 decodes quantized, twice-transformed coefficients for a block of video data and inverse quantizes the quantized, twice-transformed coefficients to determine dequantized twice-transformed coefficients (218). Video decoder 30 inverse transforms the dequantized, twice-transformed coefficients to determine transform coefficients (220). Video decoder 30 scales the transform coefficients, using the determined scaling parameters to determine scaled transform coefficients (222). Video decoder 30 inverse transform the scaled transform coefficients to determine residual data (224). The techniques of FIG. 7B may be performed separately for luma and chroma components of the video data.

Figures 8A, 8B:
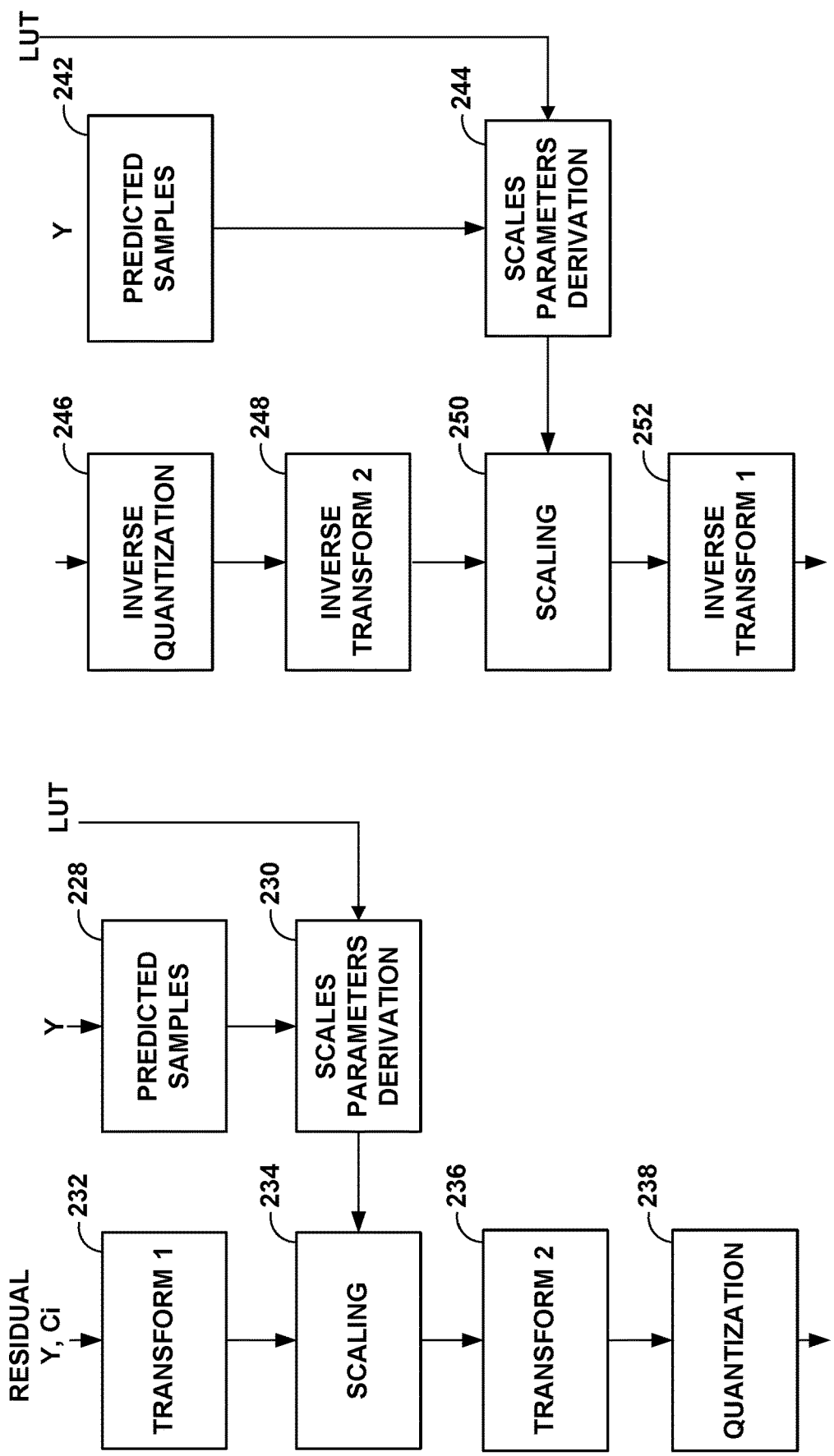
FIG. 8A is flow diagram showing an example video encoding process according to one example of the disclosure.
FIG. 8B is flow diagram showing an example video decoding process according to one example of the disclosure.

FIGS. 8A and 8B show examples of video encoding and decoding processes, respectively, where scaling is applied to transform coefficients of the first transform (Transform1) in the transform chain and scaling parameters derivation is conducted from predicted luma samples associated with currently coded color component. Scaling process at the encoder side is implemented as following:

$$X = x * \text{scale} + \text{offset}$$

Where x—term state for transform coefficients resulting from Transform 1.

Derivation process for scale value is implemented as following:

$$\text{scale} = LUT[\text{average}(pYi)], \text{offset} = 0$$

where scale is a scale value, pYi are luma samples of predicted block associated with samples of currently coded block, LUT is a lookup table predefined for currently coded color component. The LUT can be made available to encoder and decoder as a side information, or it can be provided to the decoder as parametric function through coded bitstream.

At the decoder side, an inverse process is applied. Scaling is applied to transform coefficients prior to application of the inverse Transform 1, as shown in FIG. 8B. The process of inverse scaling at the decoder side can be implemented as:

$$y = Y/\text{scale} - \text{offset}$$

where Y are decoded (dequantized and possibly processed by the inverse Transform2) scaled Transform1 coefficients and y are transform coefficients after inverse scaling is applied. The derivation process for scale value is identical to process utilized at the encoder side and can be implemented as following:

$$scale = LUT[average(pYi)],$$

where pYi are luma samples of predicted block associated with samples of currently coded block, LUT is a lookup table predefined for currently coded color component. In some examples, the process of inverse scaling through division can be implemented with multiplication and right shifts.

FIGS. 8A and 8B show examples of video encoding and decoding processes, respectively, where scaling is applied to transform coefficients of the first transform (Transform1) in the transform chain, and scaling parameters derivation is conducted from predicted luma samples associated with currently coded color component. Scaling process at the encoder side is implemented as following:

$$X = x*scale + offset$$

Where x—term state for transform coefficients resulting from Transform 1.

Derivation process for scale value is implemented as following:

$$scale = function(LUT\_Y[average(pYi)], LUT\_C[average(pCi)]), offset = 0$$

where scale is a scale value, pYi are luma samples of predicted block associated with samples of currently coded block, pCi are predicted samples for current color component, LUT_Y is a lookup table predefined for luma of the currently coded color component and LUT_C is a lookup table predefined for samples of Ci color component. The LUTs can be made available to encoder and decoder as a side information, or it can be provided to the decoder as parametric function through coded bitstream.

At the decoder side, an inverse process is applied. Scaling is applied to transform coefficients prior to application of the inverse Transform 1, as shown in FIG. 8B. The process of inverse scaling at the decoder side can be implemented as:

$$y = Y/scale - offset$$

where Y are decoded (dequantized and possibly processed by the inverse Transform2) scaled Transform1 coefficients and y are transform coefficients after inverse scaling is applied. The derivation process for scale value is identical to process utilized at the encoder side and can be implemented as following:

$$scale = function(LUT\_Y[average(pYi)], LUT\_C[average(pCi)]), offset = 0$$

where scale is a scale value, pYi are luma samples of predicted block associated with samples of currently coded block, pCi are predicted samples for current color component, LUT_Y is a lookup table predefined for luma of the currently coded color component and LUT_C is a lookup table predefined for samples of Ci color component. In some examples, the process of inverse scaling through division can be implemented with multiplication and right shifts.

In the example of FIG. 8A, video encoder 20 determines predicted samples for a luma block of video data (228). Video encoder 20 may, for example, determine the predicted samples for the luma block using intra prediction, inter prediction, or some other prediction technique. Based on the predicted samples for the luma block and based on a LUT, video encoder 20 derives scaling parameters (230). Video encoder 20 determines residual data for the block of video data and transforms the residual data using a first transform to determine transform coefficients (232). Video encoder 20 scales the transform coefficients, using the determined scaling parameters, to determine scaled transform coefficients (234). Video encoder 20 transforms the scaled transform coefficients using a second transform to determine twice-transformed, scaled coefficients (236). Video encoder 20 quantizes the twice-transformed, scaled coefficients (238). The techniques of steps 232-238 of FIG. 8A may be performed separately for luma and chroma components of the video data, but the scaling parameters for both luma and chrom are derived based on predicted samples of a luma component.

In the example of FIG. 8B, video decoder 30 determines predicted samples for a luma block of video data (242). Video decoder 30 may, for example, determine the predicted samples for the luma block using intra prediction, inter prediction, or some other prediction technique. Based on the predicted samples for the luma block and based on a LUT, video decoder 30 derives scaling parameters (244). Video decoder 30 decodes quantized, twice-transformed coefficients for a block of video data and inverse quantizes the quantized, twice-transformed coefficients to determine dequantized twice-transformed coefficients (246). Video decoder 30 inverse transforms the dequantized, twice-transformed coefficients to determine transform coefficients (248). Video decoder 30 scales the transform coefficients, using the determined scaling parameters to determine scaled transform coefficients (250). Video decoder 30 inverse transform the scaled transform coefficients to determine residual data (252). The techniques of steps 246-252 of FIG. 8A may be performed separately for luma and chroma components of the video data, but the scaling parameters for both luma and chrom are derived based on predicted samples of a luma component.

Figures 9A, 9B:
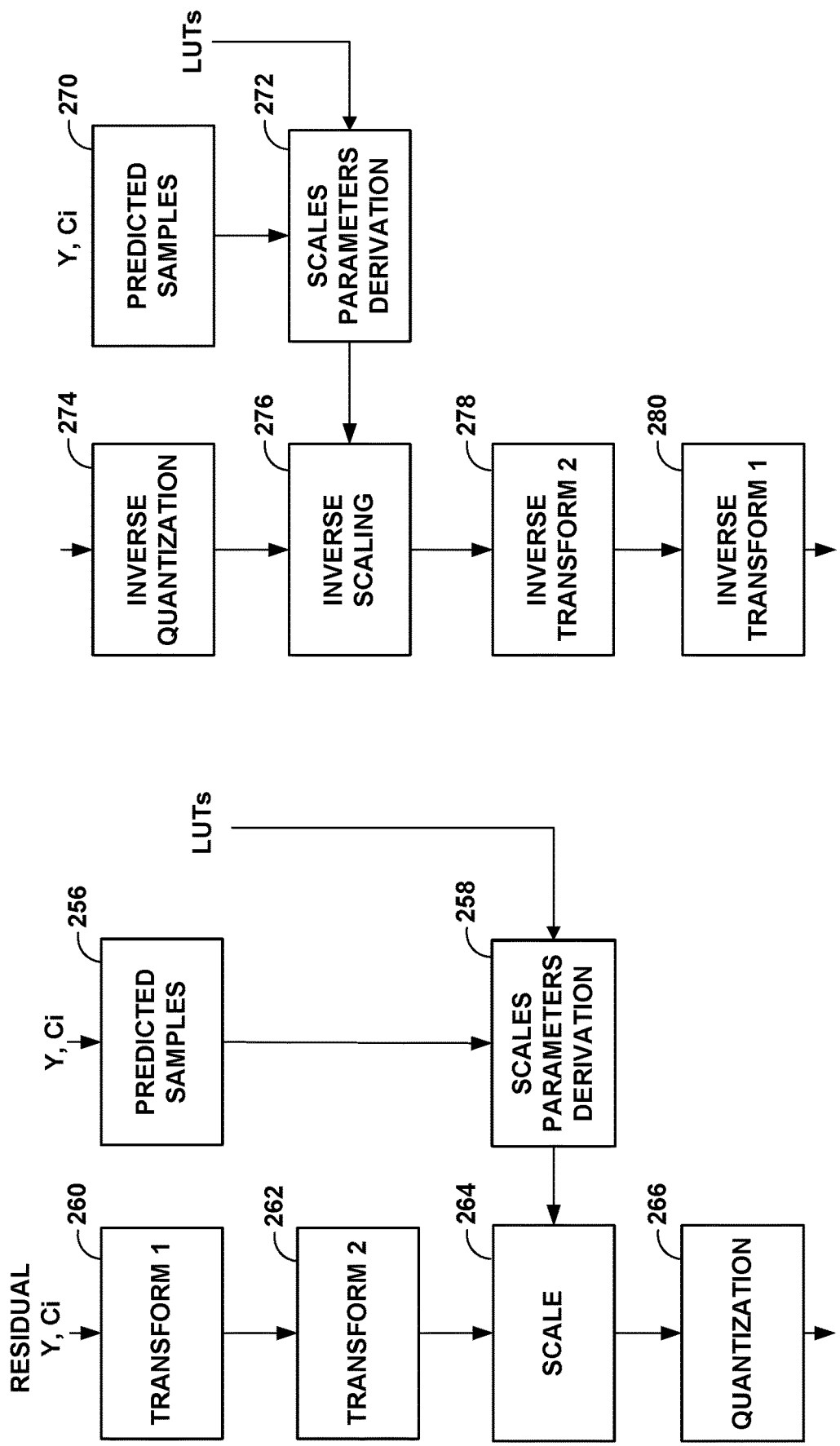
FIG. 9A is flow diagram showing an example video encoding process according to one example of the disclosure.
FIG. 9B is flow diagram showing an example video decoding process according to one example of the disclosure.

FIGS. 9A and 9B show examples of video encoding and decoding processes, respectively, where scaling is applied to transform coefficients of the final transform in the transform chain, and scaling parameters derivation is conducted as function of predicted luma samples and predicted samples for currently coded color component. Scaling process at the encoder side is implemented as following:

$$X = x*scale + offset$$

where X is transform coefficients resulting from the transform, e.g. Transform 2.

Derivation process for scale value is implemented as following:

$$scale = function(LUT\_Y[average(pYi)], LUT\_C[average(pCi)]), offset = 0$$

where scale is a scale value, pYi are luma samples of predicted block associated with samples of currently coded block, pCi are predicted samples for current color component, LUT_Y is a lookup table predefined for luma of the currently coded color component and LUT_C is a lookup table predefined for samples of Ci color component. The LUTs can be made available to encoder and decoder as a side information, or it can be provided to the decoder as parametric function through coded bitstream.

At the decoder side, an inverse process is applied. Scaling is applied to transform coefficients prior to application of the inverse Transform 1, as shown in FIG. 9B. The process of inverse scaling at the decoder side can be implemented as:

$$y = Y/scale - offset$$

where Y are decoded (dequantized) scaled Transform2 coefficients and y are transform coefficients after inverse scaling is applied. The derivation process for scale value is identical to process utilized at the encoder side and can be implemented as following:

$$scale = function(LUT\_Y[average(pYi)], LUT\_C[average(pCi)]), offset = 0$$

where scale is a scale value, pYi are luma samples of predicted block associated with samples of currently coded block, pCi are predicted samples for current color component, LUT_Y is a lookup table predefined for luma of the currently coded color component and LUT_C is a lookup table predefined for samples of Ci color component In yet other examples, introduced scaling can be combined with transform quantization scheme deployed by a video coding. In such examples, quantization denominator is updated by a scale value derived through specified above process.

$$Xq=x/(QP\_Scale-scale)$$

where x is specified for transform coefficients prior to quantization, Xq is a quantization transform coefficient and QP_Scale is a scalor of the deployed scalor quantization scheme.

In the example of FIG. 9A, video encoder 20 determines predicted samples for a block of video data (256). Video encoder 20 may, for example, determine the predicted samples using intra prediction, inter prediction, or some other prediction technique. Based on the predicted samples and based on a LUT, video encoder 20 derives scaling parameters (258). Video encoder 20 determines residual data for the block of video data and transforms the residual data using a first transform to determine transform coefficients (260). Video encoder 20 transforms the transform coefficients using a second transform to determine twice-transformed, transform coefficients (262). Video encoder 20 scales the twice-transformed, transform coefficients, using the determined scaling parameters, to determine twice-transformed, scaled coefficients (264). Video encoder 20 quantizes the twice-transformed, scaled coefficients (266). The techniques of FIG. 9A may be performed separately for luma and chroma components of the video data.

In the example of FIG. 9B, video decoder 30 determines predicted samples for a block of video data (270). Video decoder 30 may, for example, determine the predicted samples using intra prediction, inter prediction, or some other prediction technique. Based on the predicted samples and based on a LUT, video decoder 30 derives scaling parameters (272). Video decoder 30 decodes quantized, twice-transformed coefficients for a block of video data and inverse quantizes the quantized, twice-transformed coefficients to determine dequantized twice-transformed coefficients (274). Video decoder 30 scales the dequantized twice-transformed coefficients, using the determined scaling parameters to determine scaled, dequantized twice-transformed coefficients (276). Video decoder 30 inverse transforms the scaled, dequantized, twice-transformed coefficients to determine scaled, dequantized, transform coefficients (278). Video decoder 30 inverse transforms the scaled, dequantized, transform coefficients to determine residual data (280). The techniques of FIG. 7B may be performed separately for luma and chroma components of the video data.

Figures 10A, 10B:
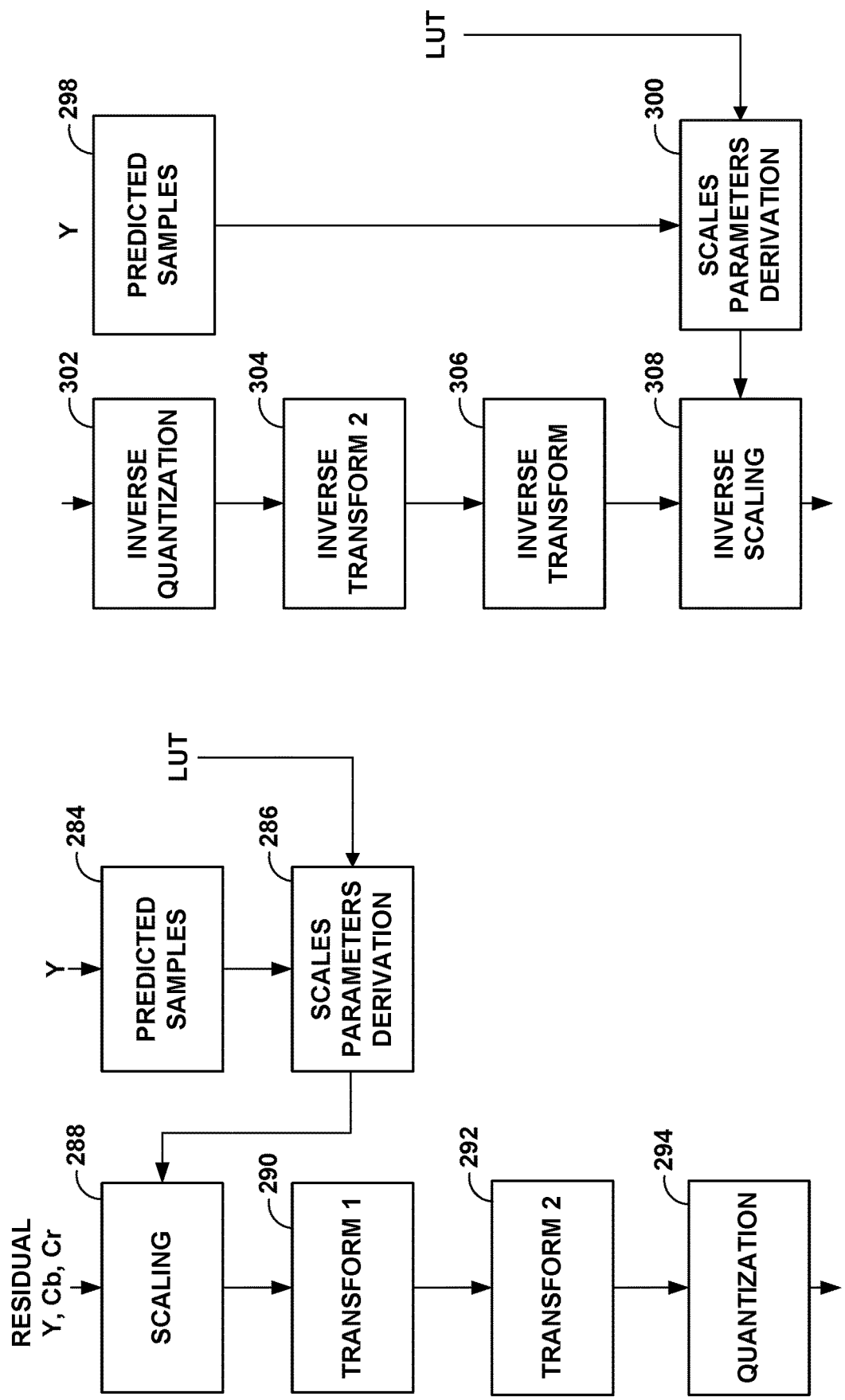
FIG. 10A is flow diagram showing an example video encoding process according to one example of the disclosure.
FIG. 10B is flow diagram showing an example video decoding process according to one example of the disclosure.

FIGS. 10A and 10B show examples of encoding and decoding, respectively, where scaling is applied to residual samples and scaling parameters derivation is conducted from predicted luma samples associated with currently coded color component. Scaling process the encoder side is implemented as following:

$$X=x*scale+offset$$

where x—samples of residuals signal being transformed by Transform1.

Derivation process for scale value is implemented as following:

$$scale=LUT\_Y[average(pYi)], offset=0$$

where scale is a scale value, pYi are luma samples of predicted block associated with samples of currently coded block, pCi are predicted samples for current color component, LUT_Y is a lookup table predefined for luma of the currently coded color component and LUT_C is a lookup table predefined for samples of Ci color component. The LUTs can be made available to encoder and decoder as a side information, or it can be provided to the decoder as parametric function through coded bitstream.

At the decoder side, an inverse process is applied. Scaling is applied to decoded residual samples following the application of inverse quantization and inverse transforms, see FIG. 10B. The process of inverse scaling at the decoder side can be implemented as:

$$y=Y/scale-offset$$

where Y are decoded scaled residual samples and y are residual samples after inverse scaling is applied. The derivation process for scale value is identical to process utilized at the encoder side and can be implemented as following:

$$scale=LUT[average(pYi)],$$

where pYi are luma samples of predicted block associated with samples of currently coded block, and LUT is a lookup table predefined for currently coded color component. In some examples, the process of inverse scaling through division can be implemented with multiplication and right shifts.

In the example of FIG. 10A, video encoder 20 determines predicted samples for a block of video data (284). Video encoder 20 may, for example, determine the predicted samples using intra prediction, inter prediction, or some other prediction technique. Based on the predicted samples and based on a LUT, video encoder 20 derives scaling parameters (286). Video encoder 20 determines residual data for the block of video data and scales the residual data, using the determined scaling parameters, to determine scaled residual data (288). Video encoder 20 transforms the scaled residual data to determine transform coefficients, (290). Video encoder 20 transforms the transform coefficients using a second transform to determine twice-transformed, transform coefficients (292). Video encoder 20 quantizes the twice-transformed, transform coefficients (294). The techniques of steps 288-294 of FIG. 10A may be performed separately for luma and chroma components of the video data, but the scaling parameters for both luma and chrom are derived based on predicted samples of a luma component.

In the example of FIG. 10B, video decoder 30 determines predicted samples for a block of video data (298). Video decoder 30 may, for example, determine the predicted samples using intra prediction, inter prediction, or some other prediction technique. Based on the predicted samples and based on a LUT, video decoder 30 derives scaling parameters (300). Video decoder 30 decodes quantized, twice-transformed coefficients for a block of video data and inverse quantizes the quantized, twice-transformed coefficients to determine dequantized twice-transformed coefficients (302). Video decoder 30 inverse transforms the dequantized, twice-transformed coefficients to determine transform coefficients (304). Video decoder 30 inverse transforms the transform coefficients to determine residual data (306). Video decoder 30 scales the residual data, using the determined scaling parameters to determine scaled residual data (308). The techniques of steps 302-308 of FIG. 10B may be performed separately for luma and chroma components of the video data, but the scaling parameters for both luma and chrom are derived based on predicted samples of a luma component.

Figure 11B:
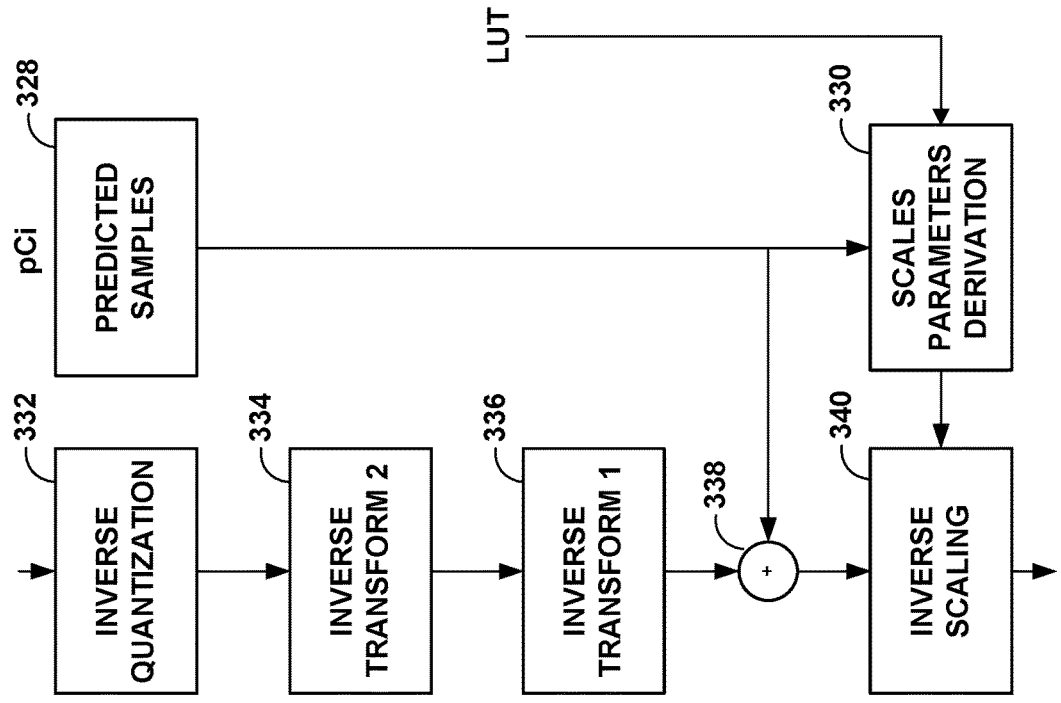
FIG. 11B is flow diagram showing an example video decoding process according to one example of the disclosure.
Figure 11A:
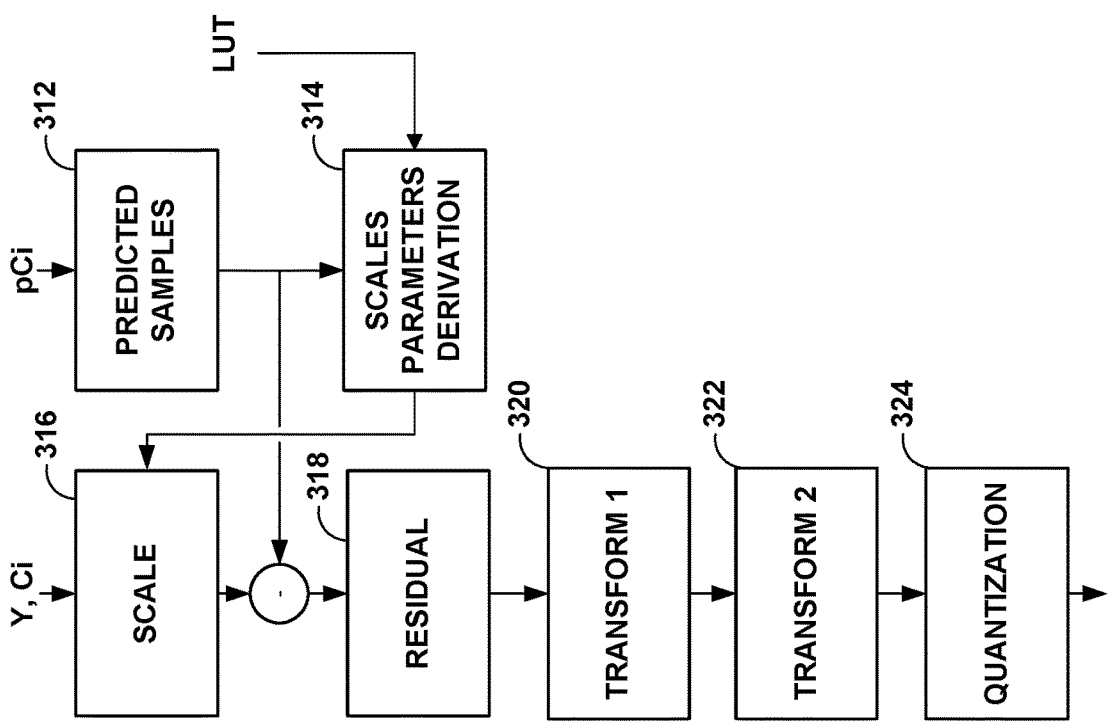
FIG. 11A is flow diagram showing an example video encoding process according to one example of the disclosure.

FIGS. 11A and 11B show examples of video encoding and decoding processes, respectively, where scaling is applied to input video samples and scaling parameters derivation is conducted from predicted samples of the currently coded color component. Scaling process at the encoder side is implemented as following:

$$X = x*\text{scale} + \text{offset}$$

where x is input video samples prior to prediction.

Derivation process for scale value is implemented as following:

$$\text{scale} = LUT\_Ci[pCi], \text{offset} = \text{function}(LUT\_Ci[pCi])$$

where scale is a scale value, pCi are predicted samples for current color component, and LUT_C is a lookup table predefined for samples of Ci color component. The LUT can be made available to encoder and decoder as a side information, or it can be provided to the decoder as parametric function through coded bitstream.

At the decoder side, an inverse process is applied. Scaling is applied to decoded video samples, as shown in FIG. 11B. The process of inverse scaling at the decoder side can be implemented as:

$$y = Y/\text{scale} - \text{offset}$$

where Y are decoded scaled video samples and y are reconstructed video samples after inverse scaling is applied. The derivation process for scale value is identical to process utilized at the encoder side and can be implemented as following:

$$\text{scale} = LUT[\text{average}(pCi)],$$

where pCi are predicted samples of currently coded block, and LUT is a lookup table predefined for currently coded color component. In some examples, the process of inverse scaling through division can be implemented with multiplication and right shifts.

In the example of FIG. 11A, video encoder 20 determines predicted samples for a block of video data (312). Video encoder 20 may, for example, determine the predicted samples using intra prediction, inter prediction, or some other prediction technique. Based on the predicted samples and based on a LUT, video encoder 20 derives scaling parameters (314). Video encoder 20 scales a block of sample values to determine a block of scaled sample values (316). Video encoder 20 subtracts the predicted samples from the block of scaled sample values to determine residual data (318). Video encoder 20 transforms the residual data to determine transform coefficients (320). Video encoder 20 transforms the transform coefficients using a second transform to determine twice-transformed, transform coefficients (322). Video encoder 20 quantizes the twice-transformed, transform coefficients (324). The techniques of FIG. 11A may be performed separately for luma and chroma components of the video data.

In the example of FIG. 11B, video decoder 30 determines predicted samples for a block of video data (328). Video decoder 30 may, for example, determine the predicted samples using intra prediction, inter prediction, or some other prediction technique. Based on the predicted samples and based on a LUT, video decoder 30 derives scaling parameters (330). Video decoder 30 decodes quantized, twice-transformed coefficients for a block of video data and inverse quantizes the quantized, twice-transformed coefficients to determine dequantized twice-transformed coefficients (332). Video decoder 30 inverse transforms the dequantized, twice-transformed coefficients to determine transform coefficients (334). Video decoder 30 inverse transforms the transform coefficients to determine residual data (336). Video decoder 30 adds the residual data to a predictive block to generate a reconstructed block (338). Video decoder 30 scales the reconstructed block, using the determined scaling parameters, to determine a scaled reconstructed block (340). The techniques of FIG. 11B may be performed separately for luma and chroma components of the video data.

In some examples, process of inverse scaling deployed at the decoder side can be implemented with integer multiplication and shifts instead of division. In such examples the process of inverse scaling at the decoder side can be implemented as:

$$y = (Y*\text{inverse\_scale} >> \text{normalization}) - \text{offset}$$

where Y are samples before application of inverse scaling, inverse_scale is an integer multiplier and normalization is an a value of right shift that conducts normalization.

Rounding operations might be included in the inverse scaling process:

$$\text{round\_parameter} = 1 << (P-1);$$

$$y = (Y*\text{inverse\_scale} + rnd) >> P$$

where round_parameter is the rounding factor for the division with floor operation. The parameter P is the precision of the operations (in number of bits).

In this way, (integer) division per pixel/coefficient are avoided at the decoder side. Increasing the number of bits of the operations (parameter P) increases the precision, but also the complexity.

In some examples, process of scaling parameters derivation can employ spatio temporal neighborhood of currently processed block. In such examples, the scaling parameters derivation process would include processing of video data (predicted samples, residual data) from neighboring coded frames or from samples of the same frame located in neighboring spatial positions and made available at the decoder prior to scaling process.

In some examples, granularity of the proposed in-loop scaling can be refined by using block sizes smaller than allowed by a prediction and transform partitions of the video system.

Scaling parameters derivation and process of scaling is applied on the block sizes smaller than block partitions (prediction or transform unit) sizes utilized by a video coding scheme. In such examples, the block which undergoes scaling (e.g. block of residual samples or block of pixel samples as shown in FIG. 7 and FIG. 8) with a size of B1 is further partitioned into a set of blocks {bi} with sizes smaller than size of B1, such that:

$$\{bi\} \in B1$$

and each block bi is processed independently.

In some examples, block partitions {bi} for both derivation and scaling process' is identical and consists of non-overlapped rectangular blocks bi. Yet in some examples, block partitions utilize in derivation process may differ from block partitions utilized in scaling. E.g., scaling can deploy a set of non-overlapped blocks {bi}, where as derivation process may be executed over the blocks {di} which overlap with each other. In some examples, other geometrical partitions, different from rectangular block may be deployed.

Parameters of such partitions may be provided to decoder as a side information, or may be made available through syntax elements of coded bitstream, e.g. as syntax elements of SPS/PPS, slice header or other.

In some examples, process of scaling can be replaced with adjustment QP parameters being applied to a current block In some examples, a quantizer weighting matrix could be explicitly signaled or a pointer to a quantizer weighting matrix known by the decoder could be signaled. In such a case, quantization weighting matrix can be modified at transform unit level in the decoder before the dequantization step. The modification may include the processing of each element in the table as follows:

$$X = x * \text{scale} + \text{offset}$$

where x is the quantizer weighting matrix element an X is the updated version. After the modified quantizer weighting matrix is derived, dequantization is applied on the coefficient level values.

The scale and offset values used in this example can be a function of prediction block luma samples such as statistical form of the prediction block luma samples, i.e., mean, standard deviation of the samples. The scale and offset values can also be derived from a combination of prediction blocks of each component (Y, Cb and Cr). In some examples, the offset value described in the examples above could be 0.

In some examples, where there is a known relationship between the scale value and the average luma value of the current block, average luma value of the block can be estimated from the received coefficient level values. In pixel domain, the sum of the prediction block and the current residual block gives the current reconstructed block. Hence, sum of average luma value of the prediction block and average value of the residual gives a close approximation. In such examples, obtained scale value should be applied on the remaining coefficients only to ensure encoder/decoder match.

In a decoder design where there is only one inverse core transform, DC coefficient can be used to calculate the estimate average residual value of the block:

$$\text{average\_luma\_current\_blok} = f(DC\_\text{coeff}) +$$
$$\text{average\_luma\_prediction} \quad \text{scale} = LUT$$
$$[\text{average\_luma\_current\_blok}]$$

And obtained scale value is applied on the remaining coefficients (AC coefficients).

In a decoder design where there are multiple transforms, DC coefficient can be estimated from a subset of the received coefficient (set n) level values:

$$\text{average\_luma\_current\_blok} = g(\text{coeffs}(n)) + \text{average\_luma\_prediction scale} = LUT[\text{average\_luma\_current\_blok}]$$

And obtained scale value is applied on the remaining coefficients (coeffs(n')).

The subset of coefficients to be used to approximate DC coefficient depends on the secondary transform. In the encoder, output of core transform is DC coefficient (as the first coefficient) and AC coefficients, which is input to the secondary transform.

Figure 12:
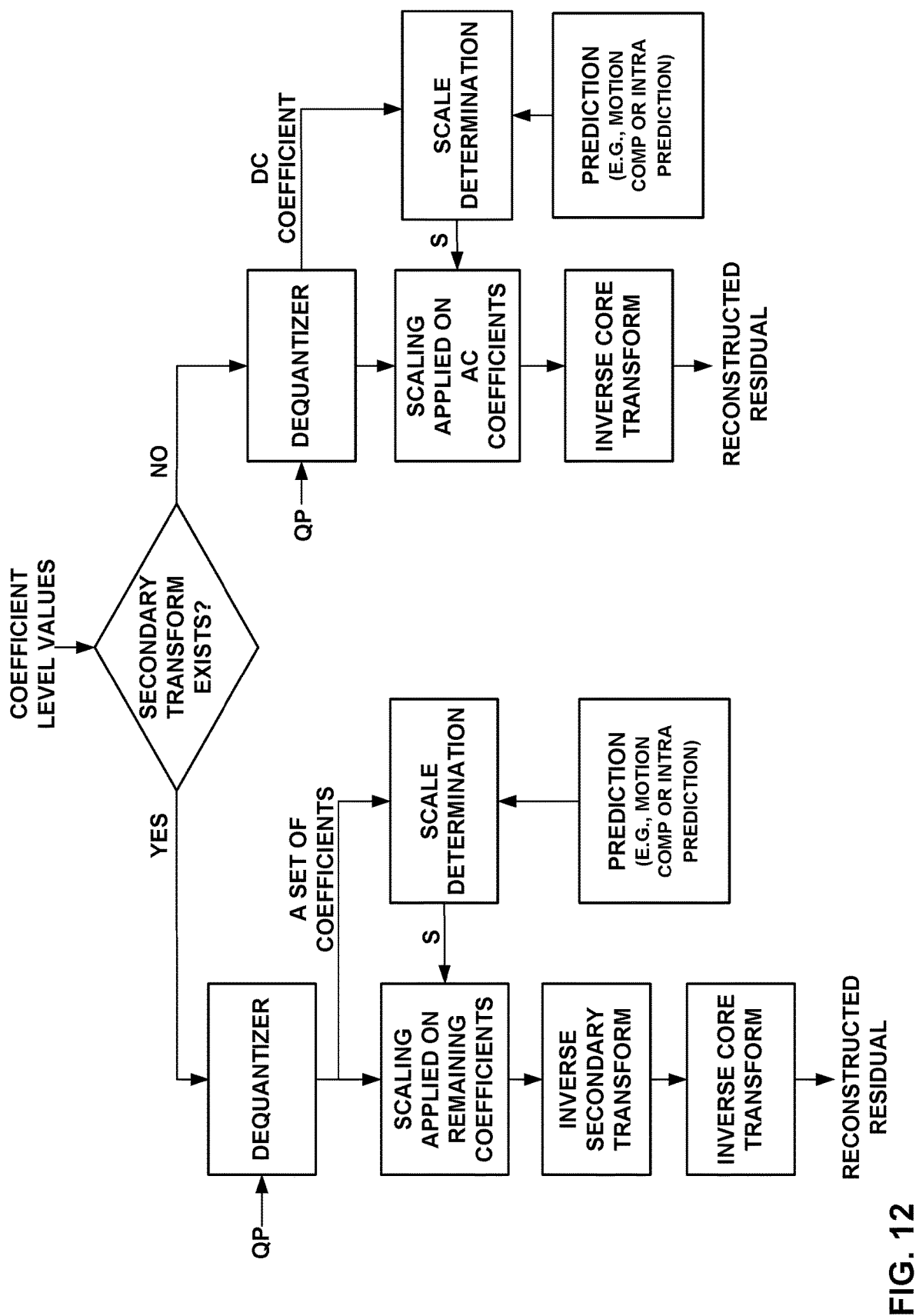
FIG. 12 is a block diagram illustrating an example video decoding system according to one example of the disclosure.

FIG. 12 illustrates an example decoder block diagram showing the scaling in case of both an inverse secondary transform exists and do not exist. When there is no secondary transform (right) scale derivation can be done using the DC coefficient and scaling is applied on AC coefficients. When there is a secondary transform, a function of a sub-set of the received and dequantized coefficients can be used to estimate the DC coefficient and derive the scale value. Scaling is applied on the remaining dequantized coefficients before the secondary transform.

In some examples, scaling can be applied in residual or reconstructed pixel domain. The granularity of the scale value can be coarse as block level (single scale value for the whole block obtained from average luma value of the prediction block) or as fine as pixel level (each pixel luma component or all three components can be scaled according to the corresponding scale value by using the luma component of the corresponding pixel in the prediction block as the index in the Look Up Table of scales). In such an example, LUT can be generated from the same LUT as in the examples described above. Size of LUT covers all possible luma values, all of which may be signaled or a subset of it may be signaled. In case a subset is signaled, intermediate values can be generated by repeating or interpolating signaled values. As a third alternative, LUT can be generated from using a polynomial function degree and coefficients of which can be signaled and values can be generated using integer arithmetic with certain precision at the decoder side. By this way, reconstructed sample values (or the residual sample values in case scaling is applied on the residual signal instead of reconstructed signal) can be reshaped with a polynomial reshaping function defined over the dynamic range of the signal (or the dynamic range of the error).

According to another example, the proposed technique may be switched off and turn to the default in some coding scenarios. Thus, video decoder 30 may, for a block of video, determine if scaling is enabled or disabled. One example of such a scenario is lossless coding. If there is an indication of lossless coding, no scaling/inverse scaling is applied. Another such coding scenario may relate to a QP parameter. If the QP parameter is below a threshold, or equal to 4 (for the entire sequence, or for specific regions (CU, slice, etc.)—that is, avoid scaling for high-quality coding, or when the quantization step is equal to 1. For other (e.g. corner) cases, it may be mandated to not apply the proposed technique, for instance, when RDPCM is applied. Similarly, for 1-D transforms (horizontal/vertical), the DC value could be obtained from the first row/column, and scaling applied to the other coefficients/samples.

For transform skip case, the technique could be applied—but there is no definition of DC coefficient when transform is skipped (everything is on the spatial domain). An option, as stated above, is to use just the average of the prediction. Alternatively, one or more of the coefficients could be used to compute an approximation of the 'average'. For instance, the 4 coefficients in the center of the block could be used to compute the average. The scaling may not be applied to those coefficients, but to the other ones.

Figure 13:
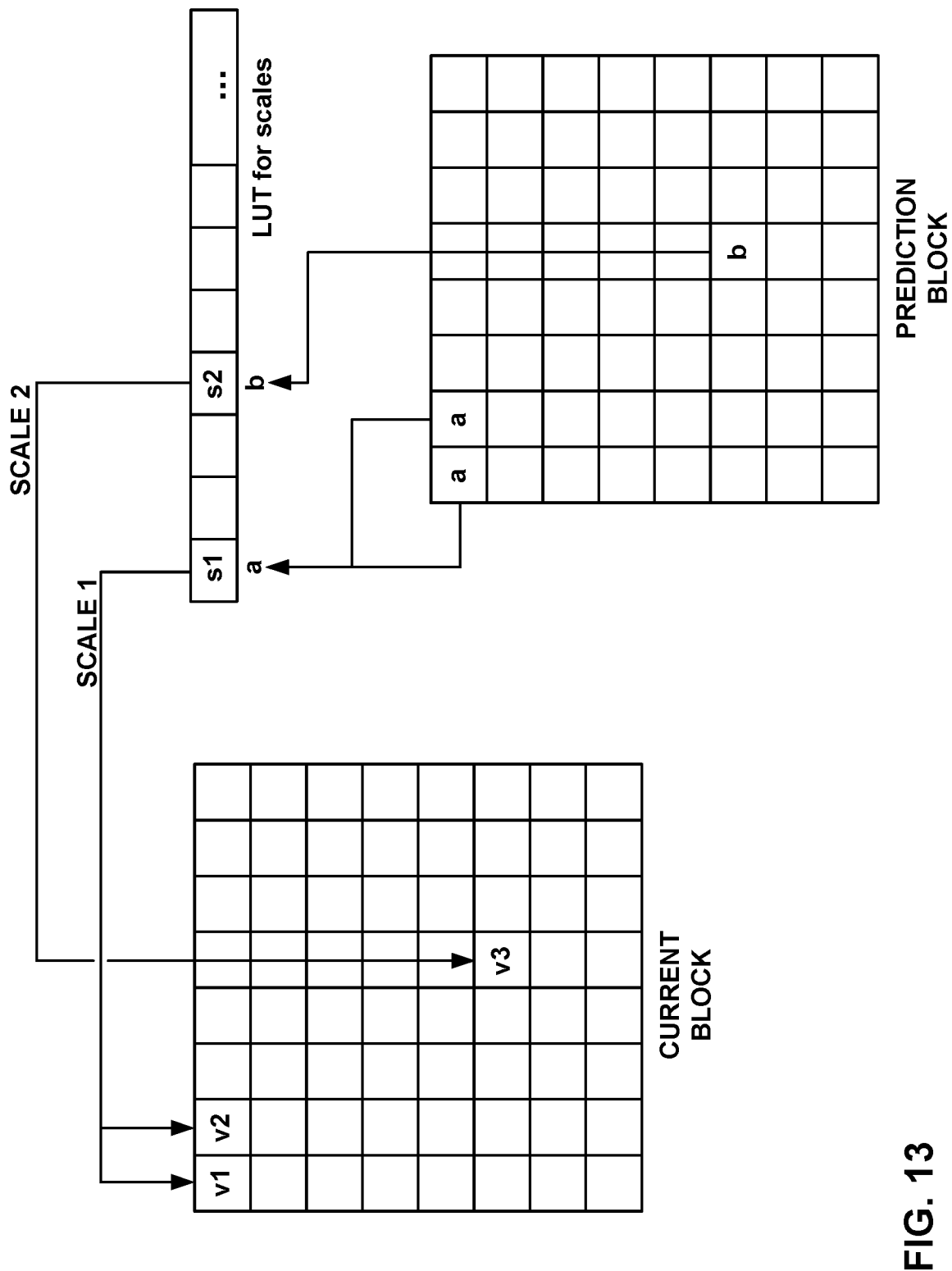
FIG. 13 is a conceptual diagram showing mapping of scaling parameters according to one example of the disclosure.

FIG. 13 is an example of scaling reconstructed pixel values based on luma values of each pixel of the prediction block. The LUT is used to map the luma value of the pixel in the prediction block to the scale value to be applied on corresponding pixel value.

Figure 14:
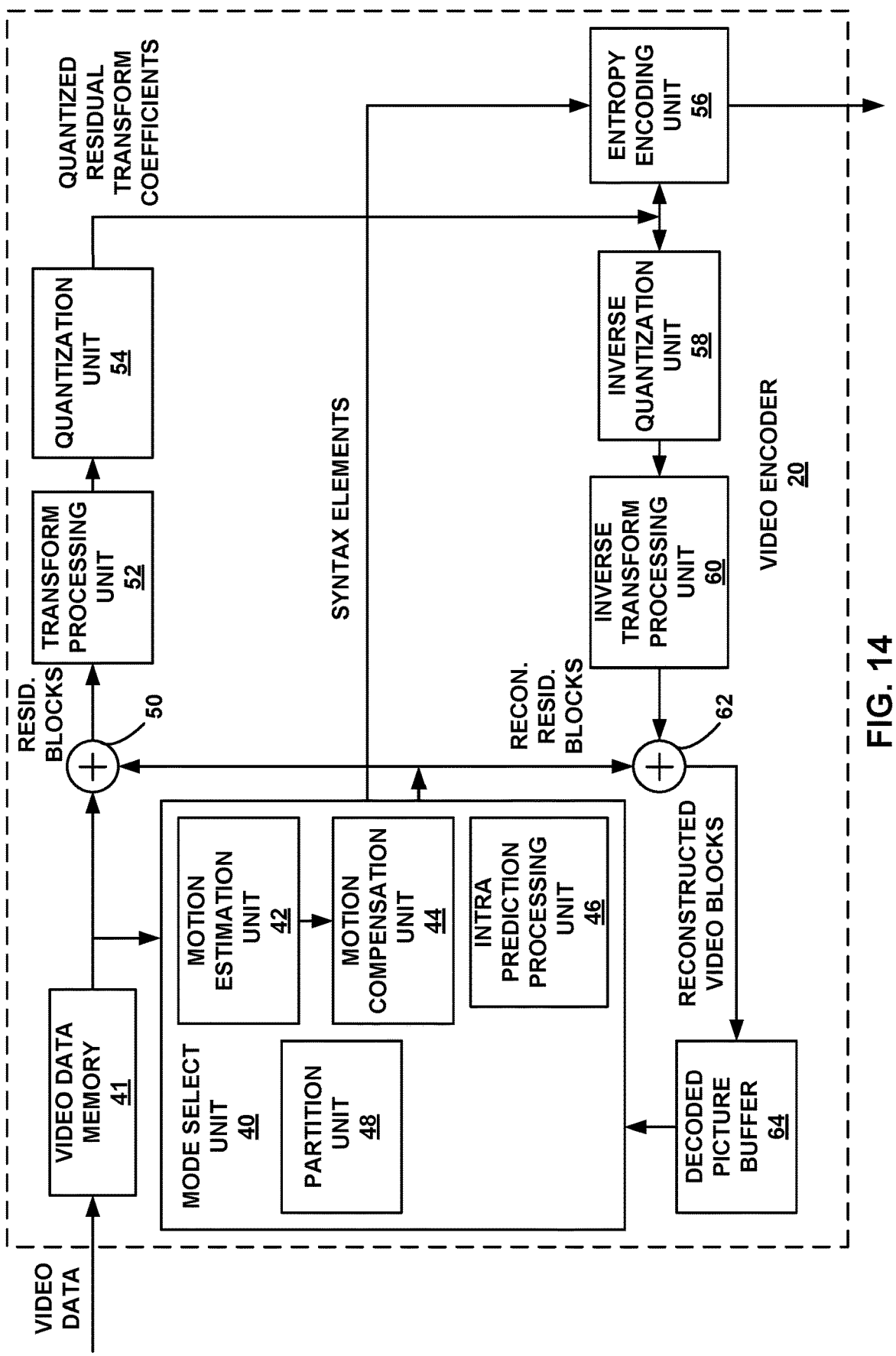
FIG. 14 is a block diagram illustrating an example of a video encoder that may implement techniques of this disclosure.

FIG. 14 is a block diagram illustrating an example of video encoder 20 that may implement the techniques of this disclosure. Video encoder 20 may perform intra- and inter-coding of video blocks within video slices in a target color container. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 14, video encoder 20 receives a current video block within a video frame to be encoded. In the example of FIG. 14, video encoder 20 includes mode select unit 40, a video data memory 41, decoded picture buffer 64, summer 50, transform processing unit 52, quantization unit 54, and entropy encoding unit 56. Mode select unit 40, in turn, includes motion compensation unit 44, motion estimation unit 42, intra prediction processing unit 46, and partition unit 48. For video block reconstruction, video encoder 20 also includes inverse quantization unit 58, inverse transform processing unit 60, and summer 62. A deblocking filter (not shown in FIG. 14) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes.

For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

After selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

Video encoder 20 may be configured to perform the techniques of this disclosure, including scaling a block of video data in a video encoding loop, using a scaling factor, to decrease a dynamic range for luminance values of the block. Various components in FIG. 14, such as mode select unit 40 and transform processing unit 52, may be configured to perform the scaling depending on where in the coding loop the scaling is performed. Mode select unit 40 may, for example, be configured to determine scaling parameters. With respect to FIGS. 7A, 8A, 9A, 10A where scaling is performed either after sequentially applying two transforms, before sequentially applying two transforms, or between the first and second transforms, transform processing unit 52 may be configured to perform the scaling. With respect to FIG. 11A, where scaling is performed on the input video, mode select unit 40 may be configured to perform the scaling.

Figure 15:
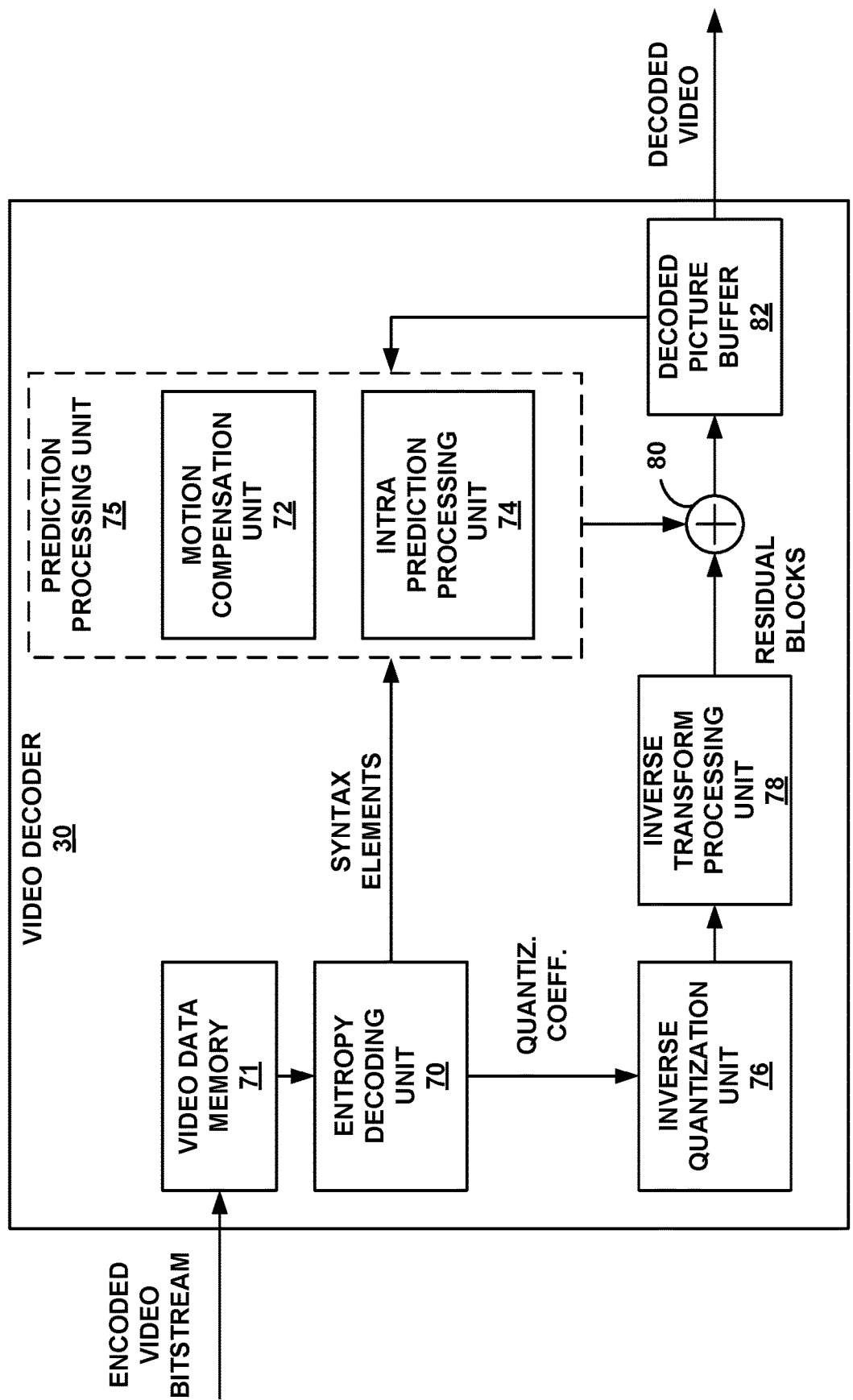
FIG. 15 is a block diagram illustrating an example of a video decoder that may implement techniques of this disclosure.

FIG. 15 is a block diagram illustrating an example of video decoder 30 that may implement the techniques of this disclosure. In the example of FIG. 15, video decoder 30 includes an entropy decoding unit 70, a video data memory 71, prediction processing unit 75, which includes motion compensation unit 72 and intra prediction processing unit 74, inverse quantization unit 76, inverse transform processing unit 78, decoded picture buffer 82 and summer 80. Video decoder 30 may, in some examples, perform a decoding pass generally reciprocal to the encoding pass described with respect to video encoder 20 (FIG. 14). Motion compensation unit 72 may generate prediction data based on motion vectors received from entropy decoding unit 70, while intra prediction processing unit 74 may generate prediction data based on intra-prediction mode indicators received from entropy decoding unit 70.

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71 and decoded picture buffer 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in decoded picture buffer 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1.

Video decoder 30 may be configured to perform the techniques of this disclosure, including scaling a block of video data in a video decoding loop, using a scaling factor, to increase a dynamic range for luminance values of the block. Various components in FIG. 15, such as prediction processing unit 75 and inverse transform processing unit 78, may be configured to perform the scaling depending on where in the coding loop the scaling is performed. Prediction processing unit 75 may, for example, be configured to determine scaling parameters. With respect to FIGS. 7B, 8B, 9B, 10B where scaling is performed either after sequentially applying two inverse transforms, before sequentially applying two inverse transforms, or between the first and second inverse transforms, inverse transform processing unit 78 may be configured to perform the scaling. With respect to FIG. 11B, where scaling is performed on the reconstructed video, video decoder 30 may be configure to apply scaling after summer 80 and before decoded picture buffer 82 by a component not explicitly shown in FIG. 15.

Figure 16:
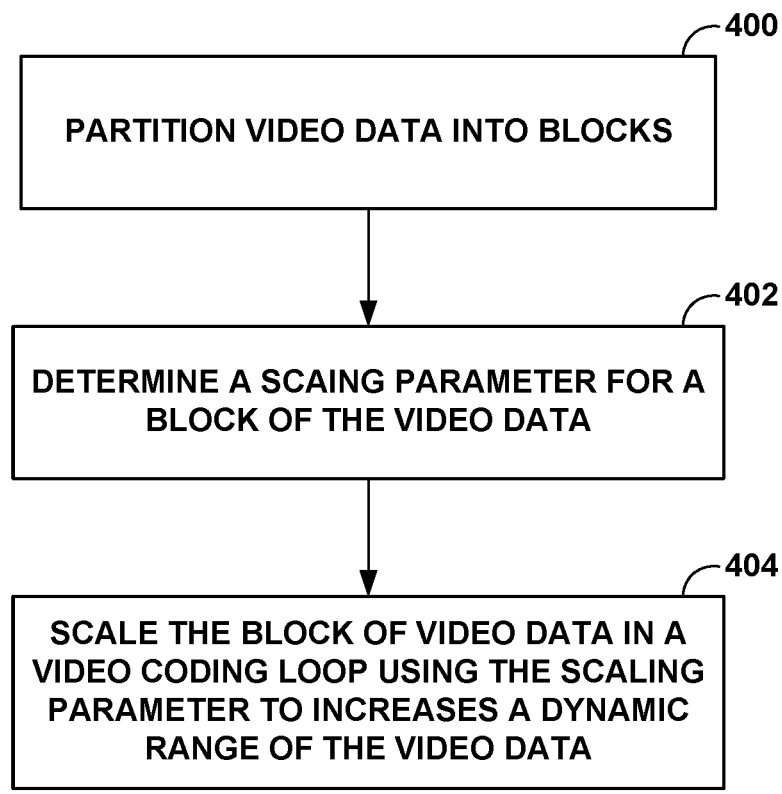
FIG. 16 is a flow diagram illustrating techniques for encoding a block of video data according to the techniques of this disclosure.

FIG. 16 is a flow diagram illustrating techniques for encoding a block of video data according to the techniques of this disclosure. The techniques of FIG. 16 will be described with respect to video encoder 20, although the techniques of FIG. 16 are not limited to any particular type of video encoder. In the example of FIG. 16, video encoder 20 partitions the video data into blocks (400). Video encoder 20 determines a scaling parameter for a block of the video data (402). The scaling parameter may, for example, include a multiplier and an offset. To determine the scaling parameter, video encoder 20 may derive the scaling parameter based on already-encoded video data, such as an intensity of predicted luma samples for the block.

Video encoder 20 scales the block in a video encoding loop using the scaling parameter to decrease a dynamic range for luminance values of the block (404). Video encoder 20 may, for example, scale the video data in the video encoding loop using the techniques described above with respect to FIGS. 7A, 8A, 9A, 10A, and 11A, using other techniques described in this disclosure, or using other techniques not described in this disclosure.

Figure 17:
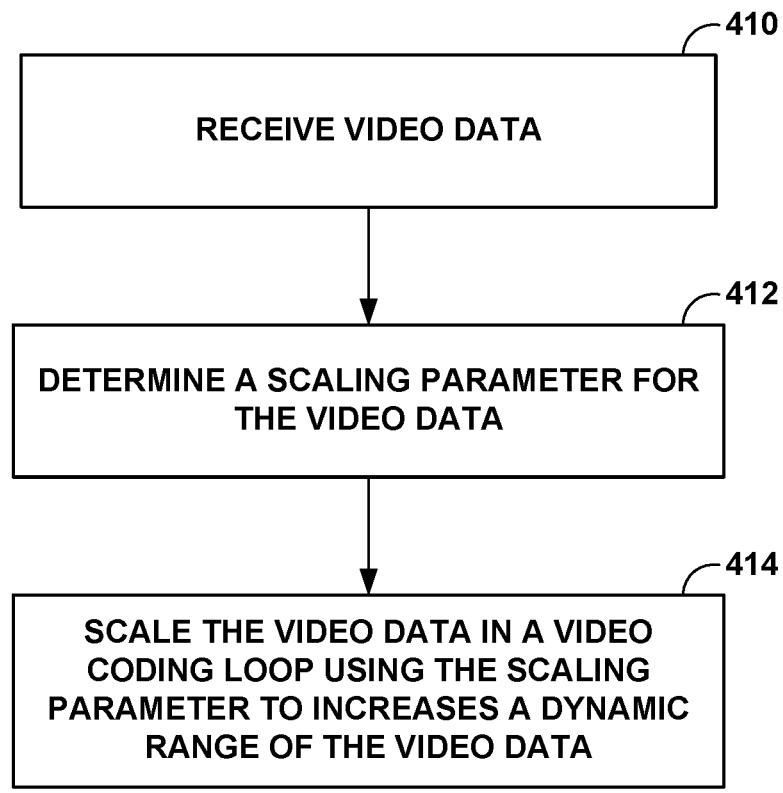
FIG. 17 is a flow diagram illustrating techniques for decoding a block of video data according to the techniques of this disclosure.

FIG. 17 is a flow diagram illustrating techniques for decoding a block of video data according to the techniques of this disclosure. The techniques of FIG. 17 will be described with respect to video decoder 30, although the techniques of FIG. 17 are not limited to any particular type of video decoder. In the example of FIG. 17, video decoder 30 receives the video data (410).

Video decoder 30 determines a scaling parameter for the video data (412). The scaling parameter may, for example, include a multiplier and an offset. In some examples, video decoder 30 may determine the scaling parameter by receiving the scaling parameter in the video data. In other examples, video decoder 30 may determine the scaling parameter by deriving the scaling parameter based on already-decoded video data without receiving the scaling parameter in the video data. The already-decoded video data may, for example, include an intensity of predicted samples for samples currently being decoded or an intensity of neighboring samples for samples currently being decoded. The predicted samples may luma samples, chroma samples, or both luma and chroma samples. Video decoder 30 may store a look up table that associates a plurality of values with a plurality of scaling parameter values. The plurality of values may, for example, be values for an average intensity of predicted samples for samples currently being decoded, an average intensity of sample values of one or more neighboring blocks of a block currently being decoded, syntax element values, or some other such values.

Video decoder 30 scales the video data in a video decoding loop using the scaling parameters to increases a dynamic range of the video data (414). Video decoder 30 may, for example, scale the video data in the video decoding loop using the techniques described above with respect to FIGS. 7B, 8B, 9B, 10B, and 11B, using other techniques described in this disclosure, or using other techniques not described in this disclosure.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by fixed function and/or programmable processing circuitry, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
  receiving the video data;
  determining a plurality of scaling parameters for a block of the video data, comprising determining a first multiplier and an offset for a luma component of the block and a second multiplier for a chroma component of the block, wherein determining the second multiplier for the chroma component comprises:

calculating an average intensity value of luma samples of one or more neighboring blocks of the block; and retrieving the second multiplier from a lookup table using the calculated average intensity value, wherein the look up table associates a plurality of average intensity values with a plurality of scaling parameters; and scaling the block in a video decoding loop using the scaling parameter comprising applying the first multiplier and the offset to residual sample values of the luma component of the block and the second multiplier to residual sample values of the chroma component of the block after performing an inverse quantization process and an inverse transform process on the block, wherein scaling the block increases a dynamic range for luma and chroma values of the block.

2. The method of claim 1, wherein determining the scaling parameters comprises receiving the scaling parameters in the video data.

3. The method of claim 1, wherein determining the scaling parameters comprises deriving the scaling parameters based on already-decoded video data without receiving the scaling parameters in the video data.

4. The method of claim 3, wherein the already-decoded video data comprises luma samples of the luma component of predicted samples for the block.

5. The method of claim 1, wherein the plurality of values comprises syntax element values.

6. The method of claim 1, wherein scaling the block in the coding loop comprises:

decoding quantized transform coefficients for the block;

inverse quantizing the quantized transform coefficients to determine dequantized transform coefficients;

inverse transforming the dequantized transform coefficients to determine residual sample values;

scaling the residual sample values using the scaling parameters to determine scaled residual sample values.

7. The method of claim 6, wherein inverse transforming the dequantized transform coefficients to determine residual sample values comprises sequentially applying two inverse transforms to the dequantized transform coefficients to determine the residual values.

8. The method of claim 1, further comprising:

for the block, determining if scaling is enabled or disabled.

9. The method of claim 8, wherein determining if scaling is enabled or disabled comprises determining scaling is enabled in response to a coding mode for the block not being a lossless coding mode and a quantization parameter for the block being above a threshold value.

10. A device for decoding video data, the device comprising:

a memory configured to store the video data and a lookup table; and one or more processors configured to:

receive the video data;

determine a plurality of scaling parameters for a block of the video data, wherein to determine the scaling parameters the one or more processors is further configured to determine a first multiplier and an offset for a luma component of the block and a second multiplier for a chroma component of the block;

wherein to determine the second multiplier for the chroma component, the one or more processors is further configured to calculate an average intensity value of luma samples of one or more neighboring blocks of the block and retrieve the second multiplier from the lookup table using the calculated average intensity value, wherein the look up table associates a plurality of average intensity values with a plurality of scaling parameters and scale the block in a video decoding loop using the scaling parameter by applying the first multiplier and the offset to residual sample values of the luma component the block and the second multiplier to residual sample values of the chroma component of the block after performing an inverse quantization process and an inverse transform process on the block, wherein scaling the block increases a dynamic range for luma and chroma values of the block.

11. The device of claim 10, wherein to determine the scaling parameter, the one or more processors are configured to receive the scaling parameters in the video data.

12. The device of claim 10, wherein to determine the scaling parameters, the one or more processors are configured to derive the scaling parameters based on already-decoded video data without receiving the scaling parameter in the video data.

13. The device of claim 12, wherein the already-decoded video data comprises luma samples of the luma component of predicted samples for the block.

14. The device of claim 10, wherein the plurality of values comprises syntax element values.

15. The device of claim 10, wherein to scale the block in the coding loop, the one or more processors are configured to:

decode quantized transform coefficients for the block;

inverse quantize the quantized transform coefficients to determine dequantized transform coefficients;

inverse transform the dequantized transform coefficients to determine residual sample values;

scale the residual sample values using the scaling parameters to determine scaled residual sample values.

16. The device of claim 15, wherein to inverse transform the dequantized transform coefficients to determine residual sample values, the one or more processors are configured to sequentially apply two inverse transforms to the dequantized transform coefficients to determine the residual values.

17. The device of claim 10, wherein the one or more processors are configured to:

for the block, determine if scaling is enabled or disabled.

18. The device of claim 17, wherein to determine if scaling is enabled or disabled, the one or more processors are configured to determine scaling is enabled in response to a coding mode for the block not being a lossless coding mode and a quantization parameter for the block being above a threshold value.

19. The device of claim 10, wherein the device comprises a wireless communication device, further comprising a receiver configured to receive encoded video data.

20. The device of claim 19, wherein the wireless communication device comprises a telephone handset and wherein the receiver is configured to demodulate, according to a wireless communication standard, a signal comprising the encoded video data.

* * * * *